(12) United States Patent
Wheelwright et al.

(10) Patent No.: US 12,717,137 B1
(45) **Date of Patent: *Aug. 25, 2026**

(54) DEVICES AND METHODS FOR ADJUSTING LENS POSITIONS BASED ON ENCODED LIGHT PATTERNS

(71) Applicant: META PLATFORMS TECHNOLOGIES, LLC, Menlo Park, CA (US)

(72) Inventors: Brian Wheelwright, Sammamish, WA (US); Jacques Gollier, Redmond, WA (US); Ying Geng, Bellevue, WA (US); Yijing Fu, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 859 days.

This patent is subject to a terminal disclaimer.

(21) Appl. No.: 17/184,359

(22) Filed: Feb. 24, 2021

Related U.S. Application Data

(63) Continuation of application No. 15/583,962, filed on May 1, 2017, now Pat. No. 10,962,777.

(51) Int. Cl.
*G02B 27/01* (2006.01)
*G02B 7/12* (2021.01)
(Continued)

(52) U.S. Cl.
CPC ........... *G02B 27/0149* (2013.01); *G02B 7/12* (2013.01); *G02B 27/0176* (2013.01);
(Continued)

(58) Field of Classification Search
CPC ........................... G02B 27/01; G02B 27/0101; G02B 27/0172; G02B 2027/0118;
(Continued)

(56) References Cited

U.S. PATENT DOCUMENTS 4,712,895 A 12/1987 Kamiyama et al.
5,499,138 A * 3/1996 Iba ...................... G02B 5/1842 359/569

(Continued)

OTHER PUBLICATIONS

Final Office Action mailed Sep. 17, 2019 for U.S. Appl. No. 15/583,962, filed May 1, 2017, 30 pages.

(Continued)

*Primary Examiner* — Nicholas R. Pasko
(74) *Attorney, Agent, or Firm* — Greenberg Traurig, LLP

(57) ABSTRACT

A device for providing position guidance light includes a first device and a second device. The first device includes a first light source for outputting first light, a second light source for outputting second light, and a first optical element for steering the first light and the second light in distinct directions so that the first light and the second light are spatially separated along a first reference axis. The second device includes a third light source for outputting third light, a fourth light source for outputting fourth light, and a second optical element for steering the third light and the fourth light in distinct directions so that the third light and the fourth light are spatially separated along a second reference axis substantially parallel or perpendicular to the first reference axis for providing a cue for adjusting a distance of an eye from the device.

20 Claims, 18 Drawing Sheets

(51) Int. Cl.
*G02B 27/42* (2006.01)
*G06T 7/73* (2017.01)

(52) U.S. Cl.
CPC ....... *G02B 27/0179* (2013.01); *G02B 27/425* (2013.01); *G06T 7/74* (2017.01); *G02B 2027/0159* (2013.01); *G02B 2027/0163* (2013.01); *G02B 2027/0181* (2013.01); *G06T 2207/10152* (2013.01); *G06T 2207/30201* (2013.01)

(58) Field of Classification Search
CPC ...... G02B 2027/012; G02B 2027/0121; G02B 2027/0132; G02B 2027/0134; G02B 2027/0143; G02B 2027/0154; G02B 2027/0159; G02B 2027/0161; G02B 2027/0163; G06T 7/74
USPC .................................................. 359/630–633
See application file for complete search history.

(56) References Cited

U.S. PATENT DOCUMENTS 5,714,967 A * 2/1998 Okamura ............. G02B 27/017 345/9
5,825,340 A * 10/1998 Torizuka .............. G02B 27/017 348/E13.044
5,936,663 A * 8/1999 Tabata ................. H04N 13/111 348/E13.067
6,122,101 A * 9/2000 Tanijiri .................... G02B 7/06 345/85
7,174,094 B2 2/2007 Steinkamp
10,254,507 B1 * 4/2019 Wheelwright ............ G06T 7/74
10,534,156 B2 * 1/2020 Fu ........................... A61B 3/111
10,962,777 B1 * 3/2021 Wheelwright ....... G02B 27/425
2006/0250322 A1 * 11/2006 Hall ................... G02B 27/0172 345/8
2008/0198470 A1 8/2008 Hamilton
2012/0250152 A1 * 10/2012 Larson ................... G02B 30/25 359/464
2013/0120224 A1 * 5/2013 Cajigas .............. G02B 27/0172 345/8
2015/0035744 A1 * 2/2015 Robbins ............... G02B 27/017 345/156
2016/0070103 A1 * 3/2016 Yoon ........................ G02B 3/08 345/633
2016/0103326 A1 * 4/2016 Kimura .............. G02B 27/0179 345/690
2017/0212361 A1 * 7/2017 Staton ....................... G02B 7/04
2017/0296421 A1 * 10/2017 Travers .............. G02B 27/0172

OTHER PUBLICATIONS

Non-Final Office Action mailed Apr. 5, 2019 for U.S. Appl. No. 15/583,962, filed May 1, 2017, 24 pages.
Non-Final Office Action mailed May 21, 2019 for U.S. Appl. No. 15/999,329, filed Aug. 17, 2018, 13 pages.
Notice of Allowance mailed Aug. 28, 2019 for U.S. Appl. No. 15/999,329, filed Aug. 17, 2018, 9 pages.
Notice of Allowance mailed Nov. 28, 2018 for U.S. Appl. No. 15/583,952, filed May 1, 2017, 9 pages.

* cited by examiner

DEVICES AND METHODS FOR ADJUSTING LENS POSITIONS BASED ON ENCODED LIGHT PATTERNS

RELATED APPLICATIONS

This application is a continuation application of U.S. patent application Ser. No. 15/583,962, filed May 1, 2017, entitled "Devices and Method for Adjusting Lens Positions Based on Encoded Light Patterns," which is incorporated by reference herein in its entirety.

This application is related to U.S. patent application Ser. No. 15/583,952, filed May 1, 2017, entitled "Devices and Methods for Adjusting an Interpupillary Distance Based on Encoded Light Patterns," which is incorporated by reference herein in its entirety.

TECHNICAL FIELD

This relates generally to display devices, and more specifically to head-mounted display devices.

BACKGROUND

Head-mounted display devices (also called herein head-mounted displays) are gaining popularity as means for providing visual information to user. Different users can have different interpupillary distances, and it is important to set up a head-mounted display device for the correct interpupillary distance of a user, as an incorrect interpupillary distance can cause visual distortion.

However, determining an accurate interpupillary distance has often required professional assistance (e.g., a measurement by an optician). In the absence of such professional assistance, users often set up display devices for incorrect interpupillary distances, which reduces the user experience with such devices.

In addition, placing an eye of a user at an appropriate distance from an exit pupil (e.g., a last lens) of a head-mounted display device is also important. When the eye is located at a position that does not correspond to a design eye relief, the field of view is reduced, which also reduces the user experience with the head-mounted display device.

SUMMARY

Accordingly, there is a need for an improved method and an improved device for adjusting an interpupillary distance, thereby improving the user experience with display devices. In addition, there is a need for an improved method and an improved device for adjusting an eye relief, thereby improving the user experience with display devices.

The above deficiencies and other problems are reduced or eliminated by the disclosed devices and methods.

In accordance with some embodiments, a device includes a first light source device configured to transmit a first light in a first direction and a second light in a second direction that is distinct from the first direction; and a first set of one or more lenses configured for directing the first light and the second light from the first light source device toward a first eye of a user. The first light is spatially offset from the second light and one or more of the first light and the second light provide a cue for adjusting a location of the first set of one or more lenses.

In accordance with some embodiments, a method includes transmitting a first light in a first direction and a second light that is distinct from the first light in a second direction that is distinct from the first direction; and transmitting the first light and the second light through a first set of one or more lenses and directing the first light and the second light toward a first eye of a user. The first light is spatially offset from the second light and one or more of the first light and the second light provide a cue for adjusting a location of the first set of one or more lenses.

In accordance with some embodiments, a method includes receiving a portion of a bundle of light that includes a first light and a second light that is distinct from the first light and laterally offset from the first light; and, in accordance with a determination that the received portion of the bundle of light corresponds to the first light, moving the first set of one or more lenses.

In accordance with some embodiments, a device includes a first light source device configured to transmit a first light in a first direction; a second light source device configured to transmit a second light in a second direction; and a first set of one or more lenses configured for directing, toward a first eye of a user, the first light from the first light source device and the second light from the second light source device so that the first light intersects with the second light at a first location. One or more of the first light and the second light provide a cue for adjusting a location of the first set of one or more lenses relative to the first eye of the user.

In accordance with some embodiments, a method includes transmitting, from a first light source device, a first light in a first direction and transmitting, from a second light source device, a second light that is distinct from the first light in a second direction. The method also includes transmitting the first light and the second light through a first set of one or more lenses and directing the first light and the second light toward a first eye of a user.

In accordance with some embodiments, a method includes receiving a portion of a light beam that includes a first light from a first light source device and a second light that is distinct from the first light from a second light source device. The first light and the second light have been transmitted through a first set of one or more lenses. After transmitting through the first set of one or more lenses, the first light is configured to intersect with the second light. The method also includes, in accordance with a determination that the received portion of the light beam does not include both the first light and the second light, adjusting an eye relief.

Thus, the disclosed embodiments provide devices and methods that facilitate accurate determination and/or adjustment of interpupillary distances. In addition, the disclosed embodiments provide devices and methods that facilitate accurate determination and/or adjustment of eye reliefs.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1A:
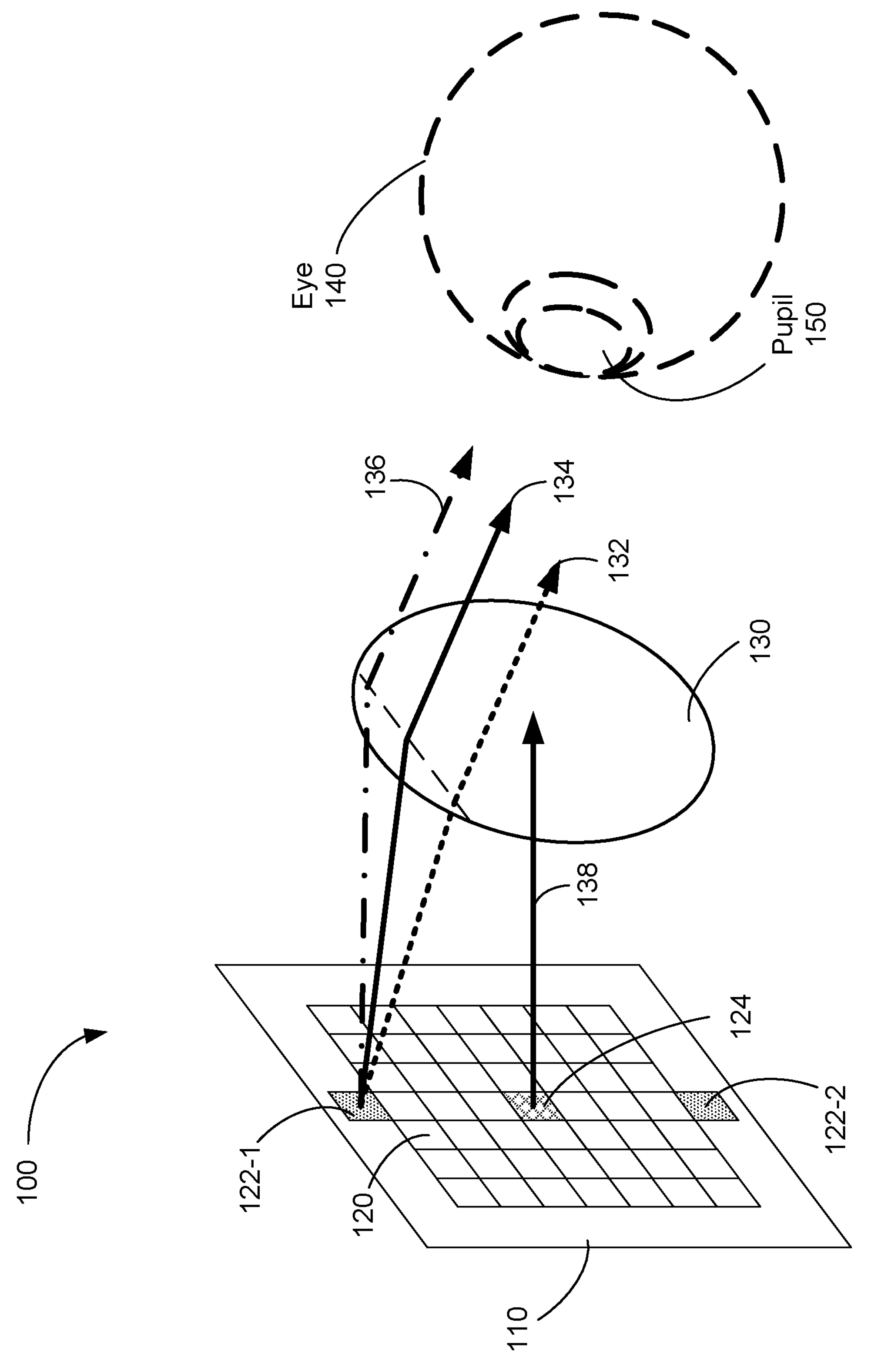
FIG. 1A is a schematic diagram of a device for determining and/or adjusting an offset of a lens in accordance with some embodiments.

These figures are not drawn to scale unless indicated otherwise.

DETAILED DESCRIPTION

Many viewing optics (e.g., eyeglasses, head-mounted display devices, etc.) require a correct positioning of the viewing optics relative to a position of an eye. Incorrect positioning of viewing optics can cause visual distortion. However, determining an accurate interpupillary distance has often required professional assistance (e.g., a measurement by an optician). In the absence of such professional assistance, users can set up viewing optics for incorrect interpupillary distances. For example, users may be asked to adjust lateral positions of lenses until a crosshair appears the sharpest. Certain users may not be able to accurately determine when the crosshair appears the sharpest.

The disclosed device, including a light source device coupled with one or more lenses, allows accurate determination and/or adjustment of an interpupillary distance utilizing a projection of an encoded light pattern. In addition, the disclosed device allows accurate determination and/or adjustment of an eye relief utilizing a projection of an encoded light pattern.

In some embodiments, the light source device and the one or more lenses are included in a head-mounted display device, which is, in turn, used for providing virtual reality and/or augmented reality content. In some embodiments, the light source device and the one or more lenses are included in a stand-alone diagnostic device for determining an interpupillary distance.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first lens could be termed a second lens, and, similarly, a second lens could be termed a first lens, without departing from the scope of the various described embodiments. The first lens and the second lens are both lenses, but they are not the same lens.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1A is an isometric view of display device 100 in accordance with some embodiments. In some other embodiments, display device 100 is part of some other electronic display (e.g., head-mounted displays, digital microscope, etc.). In some embodiments, display device 100 includes light emission device array 110 and one or more lenses (e.g., lens 130). Light emission device array 110 emits image light toward a viewing user.

In some embodiments, light emission device array 110 includes light emission devices 120 (e.g., pixels) that emit light in the visible light. For example, light emission device array 110 includes an array of light-emitting diodes (LEDs), an array of microLEDs, an array of OLEDs, or some combination thereof.

In some embodiments, light emission device array 110 includes one or more light sources (e.g., a fluorescent light source or a broadband light source, such as a white LED) and an emission intensity array. The emission intensity array is configured to selectively attenuate light emitted from the one or more light sources. In some embodiments, the emission intensity array is composed of a plurality of liquid crystal cells or pixels. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to control what portion of the image light emitted from the one or more light sources is passed to the one or more lenses (e.g., lens 130). In some embodiments, the one or more light sources include light emission devices 120, such as an array of LEDs, an array of microLEDs, an array of OLEDs, or a combination thereof.

One or more lenses (e.g., lens 130) receive light from emission device array 110, and direct the light to a location of pupil 150. In some embodiments, lens 130 includes one or more diffractive optics. In some embodiments, the one or more lenses include active lens. An active lens is a lens whose lens curvature and/or refractive ability may be dynamically controlled (e.g., via a change in applied voltage). An active lens may be a liquid crystal lens, a liquid lens (e.g., using electro-wetting), or some other lens whose curvature and/or refractive ability may be dynamically controlled, or some combination thereof. Accordingly, in some embodiments, system 200 (described with respect to FIG. 2) may dynamically adjust the curvature and/or refractive ability of active lenslets to direct light received from light emission device array 110 to pupil 150.

FIG. 1A also illustrates one or more light source devices 122 (e.g., light source device 122-1 and/or light source device 122-2) are located adjacent to light emission device array 110. In some embodiments, one or more light source devices 122 are integrated with light emission device array 110. In some embodiments, one or more light source devices 122 are separate from light emission device array 110, but one or more light source devices 122 are located in proximity to light emission device array 110 (e.g., one or more light source devices 122 are located on light emission device array 110). In some embodiments, light source device 122 (e.g., light source device 122-1 and/or light source device 122-2) is located adjacent to a top or bottom edge of light emission device array 110.

In some embodiments, light source device 122 (e.g., light source device 122-1 and/or light source device 122-2) is located adjacent to a center of a top or bottom edge of light emission device array 110. For example, in FIG. 1A, light source device 122-1 is located adjacent to a center of a top edge of light emission device array 110, and light source device 122-2 is located adjacent to a center of a bottom edge of light emission device array 110. In some embodiments, a light source device (e.g., light source device 122-1 or light source device 122-2) is located within at least 1 mm, 2 mm, 3 mm, 4 mm, or 5 mm from a center of a top or bottom edge of light emission device array 110. In some embodiments, the device provides to a user instructions to look toward light source device 122 (e.g., look up or look down, depending on the location of light source device 122).

In FIG. 1A, light source device 122-1 emits first light 132 (e.g., a red light) in a first direction, second light 134 (e.g., a green light) in a second direction, and third light 136 (e.g., a blue light) in a third direction. First light 132, second light 134, and third light 136 are spatially separated. In some cases, only one of first light 132, second light 134, and third light 136 enters through pupil 150 of eye 140 depending on a position of eye 140 (e.g., a position of pupil 150 of eye 140). Thus, the projection of first light 132, second light 134, and third light 136 can be used to determine whether lens 130 is aligned with eye 140.

In some embodiments, light emission device array 110 also displays additional features for assisting a user with determining whether lens 130 is aligned with eye 140. In FIG. 1A, one or more light emission devices 120 (e.g., such as pixel 124) of light emission device array 110 optionally emit reference light 138. In some embodiments, reference light 138 corresponds to second light 134 (e.g., reference light 138 has a same color and/or a same pulsing frequency as second light 134) so that reference light 138 can serve as a guide for determining whether lens 130 is aligned with eye 140. In some embodiments, light emission device array 110 optionally displays instructions for guiding users in adjusting the position of lens 130.

Figure 1B:
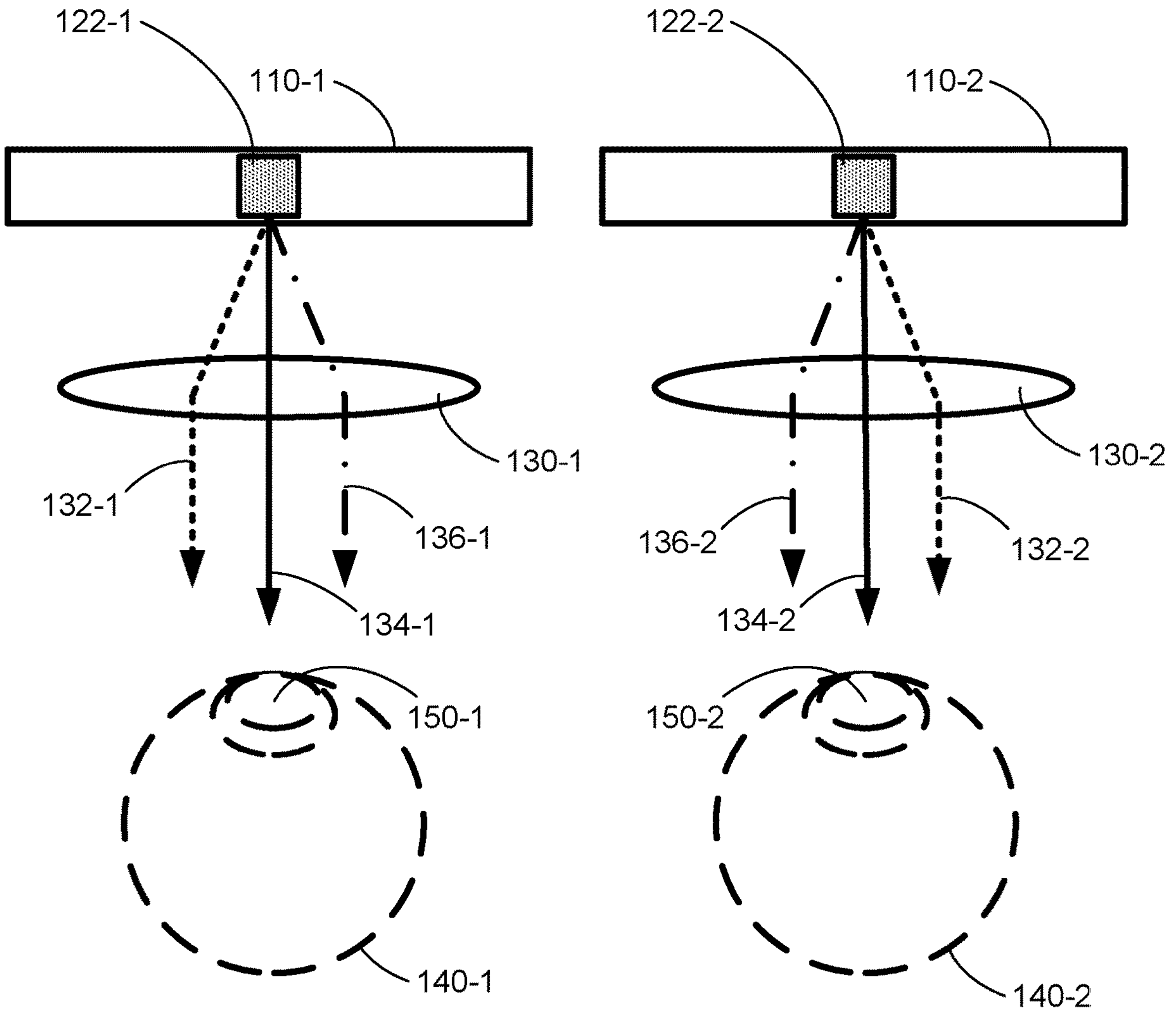
FIG. 1B is a schematic diagram illustrating an example configuration where lenses are aligned with eyes.

FIG. 1B is a schematic diagram illustrating an example configuration (e.g., an example plan view) where lenses are aligned with eyes.

In FIG. 1B, the device includes light source device 122-1 and light source device 122-2. In some embodiments, light source device 122-1 is coupled with light emission device array 110-1 (e.g., a display screen) and light source device 122-2 is coupled with light emission device array 110-2 (e.g., a display screen). In some embodiments, light source device 122-1 is located adjacent to a lateral center of light emission device array 110. In some embodiments, light source device 122-1 is located adjacent to a lateral center of a top or bottom edge of light emission device array 110.

Light source device 122-1 emits first light 132-1 (e.g., a red light) in a first direction, second light 134-1 (e.g., a green light) in a second direction, and third light 136-1 (e.g., a blue light) in a third direction. First light 132-1, second light 134-1, and third light 136-1 from light source device 122-1 are transmitted through lens 130-1, which direct first light 132-1, second light 134-1, and third light 136-1 toward eye 140-1 (e.g., a left eye). For example, first light 132-1, second light 134-1, and third light 136-1 are collimated after passing through lens 130-1. In some embodiments, light source device 122-1 is located at a focal plane of lens 130-1. As shown in FIG. 1B, first light 132-1 is spatially separated from second light 134-1 and third light 136-1, and second light 134-1 is spatially separated from third light 136-1, after passing through lens 130-1. In some embodiments, first light 132-1 is parallel to second light 134-1 and third light 136-1 after passing through lens 130-1. In some embodiments, first light 132-1 is spatially offset from second light 134-1 by at least 1 mm, 2 mm, 3 mm, 4 mm, 5 mm, 6 mm, 7 mm, 8 mm, 9 mm, or 10 mm. In some embodiments, second light 134-1 is spatially offset from third light 136-1 by at least 1 mm, 2 mm, 3 mm, 4 mm, 5 mm, 6 mm, 7 mm, 8 mm, 9 mm, or 10 mm.

Similarly, light source device 122-2 emits fourth light 132-2 (e.g., a red light) in a fourth direction, fifth light 134-2 (e.g., a green light) in a fifth direction, and sixth light 136-2 (e.g., a blue light) in a sixth direction. Fourth light 132-2, fifth light 134-2, and sixth light 136-2 from light source device 122-2 are transmitted through lens 130-2, which direct fourth light 132-2, fifth light 134-2, and sixth light 136-2 toward eye 140-2 (e.g., a right eye). For example, fourth light 132-2, fifth light 134-2, and sixth light 136-2 are collimated after passing through lens 130-2. In some embodiments, light source device 122-2 is located at a focal plane of lens 130-2. As shown in FIG. 1B, fourth light 132-2 is spatially separated from fifth light 134-2 and sixth light 136-2, and fifth light 134-2 is spatially separated from sixth light 136-2, after passing through lens 130-2. In some embodiments, fourth light 132-2 is parallel to fifth light 134-2 and sixth light 136-2 after passing through lens 130-2. In some embodiments, fourth light 132-2 is spatially offset from fifth light 134-2 by at least 1 mm, 2 mm, 3 mm, 4 mm, 5 mm, 6 mm, 7 mm, 8 mm, 9 mm, or 10 mm. In some embodiments, fifth light 134-2 is spatially offset from sixth light 136-2 by at least 1 mm, 2 mm, 3 mm, 4 mm, 5 mm, 6 mm, 7 mm, 8 mm, 9 mm, or 10 mm.

In FIG. 1B, a lateral position of eye 140-1 is aligned with a lateral position of lens 130-1 (e.g., a lateral position of an optical center of lens 130-1), and second light 134-1 (e.g., a green light) enters through pupil 150-1 of eye 140-1. In addition, a lateral position of eye 140-2 is aligned with a lateral position of lens 130-2 (e.g., a lateral position of an optical center of lens 130-2), and fifth light 134-2 (e.g., a green light) enters through pupil 150-2 of eye 140-2. FIG. 1B also shows that first light 132-1 (e.g., a red light) and third light 136-1 (e.g., a blue light) do not enter through pupil 150-1 of eye 140-1, and fourth light 132-2 (e.g., a red light) and sixth light 136-2 (e.g., a blue light) do not enter through pupil 150-2 of eye 140-2. Second light 134-1 (e.g., a green light) received with eye 140-1 indicates that a lateral position of lens 130-1 is aligned with a lateral position of eye 140-1 and fifth light 134-2 (e.g., a green light) received with eye 140-2 indicates that a lateral position of lens 130-2 is aligned with a lateral position of eye 140-2. Thus, no adjustment of the lateral position of lens 130-1 or the lateral position of lens 130-2 is necessary.

Figure 1C:
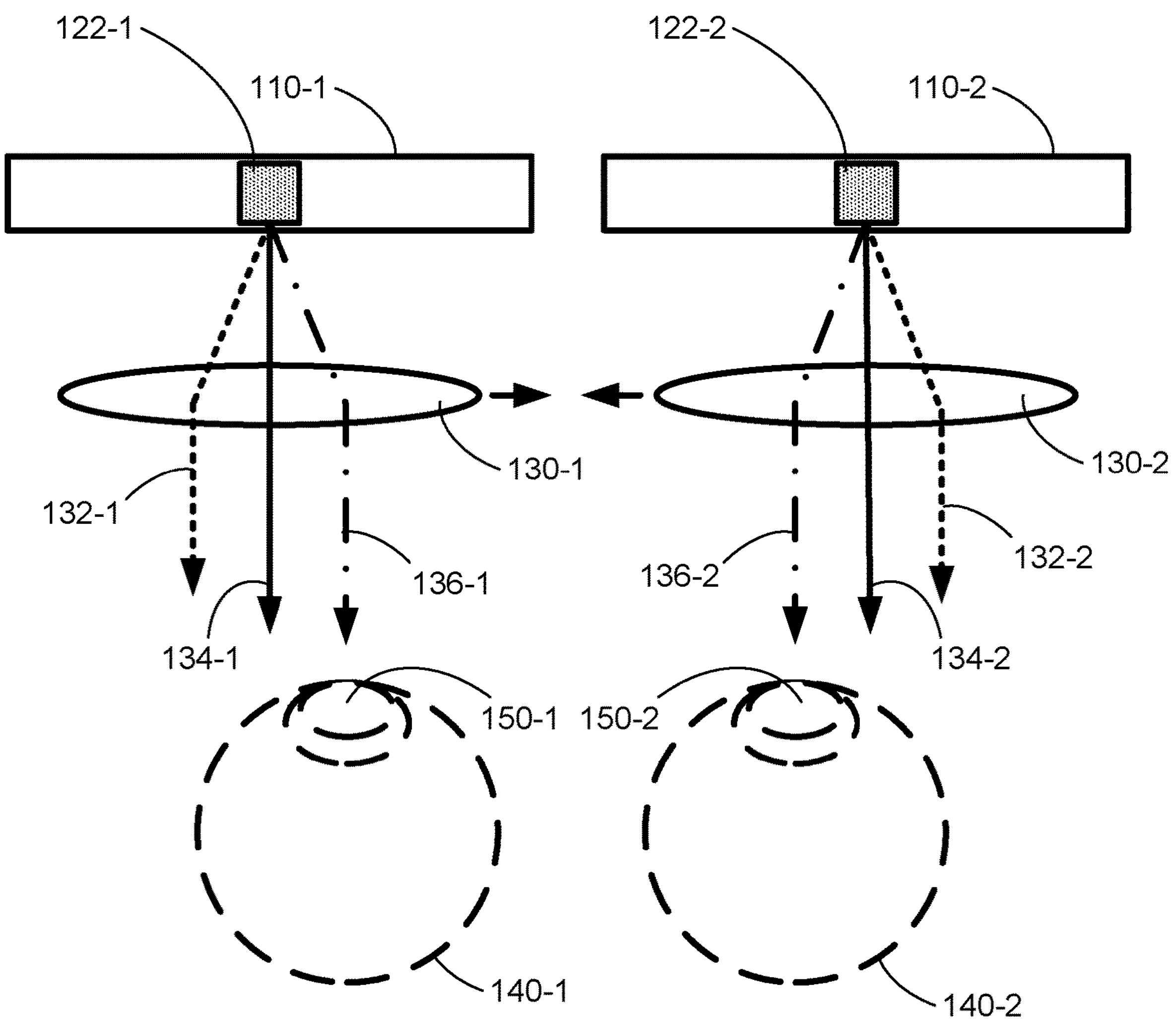
FIGS. 1C-1E are schematic diagrams illustrating example configurations where lenses are not aligned with eyes.
Figure 1D:
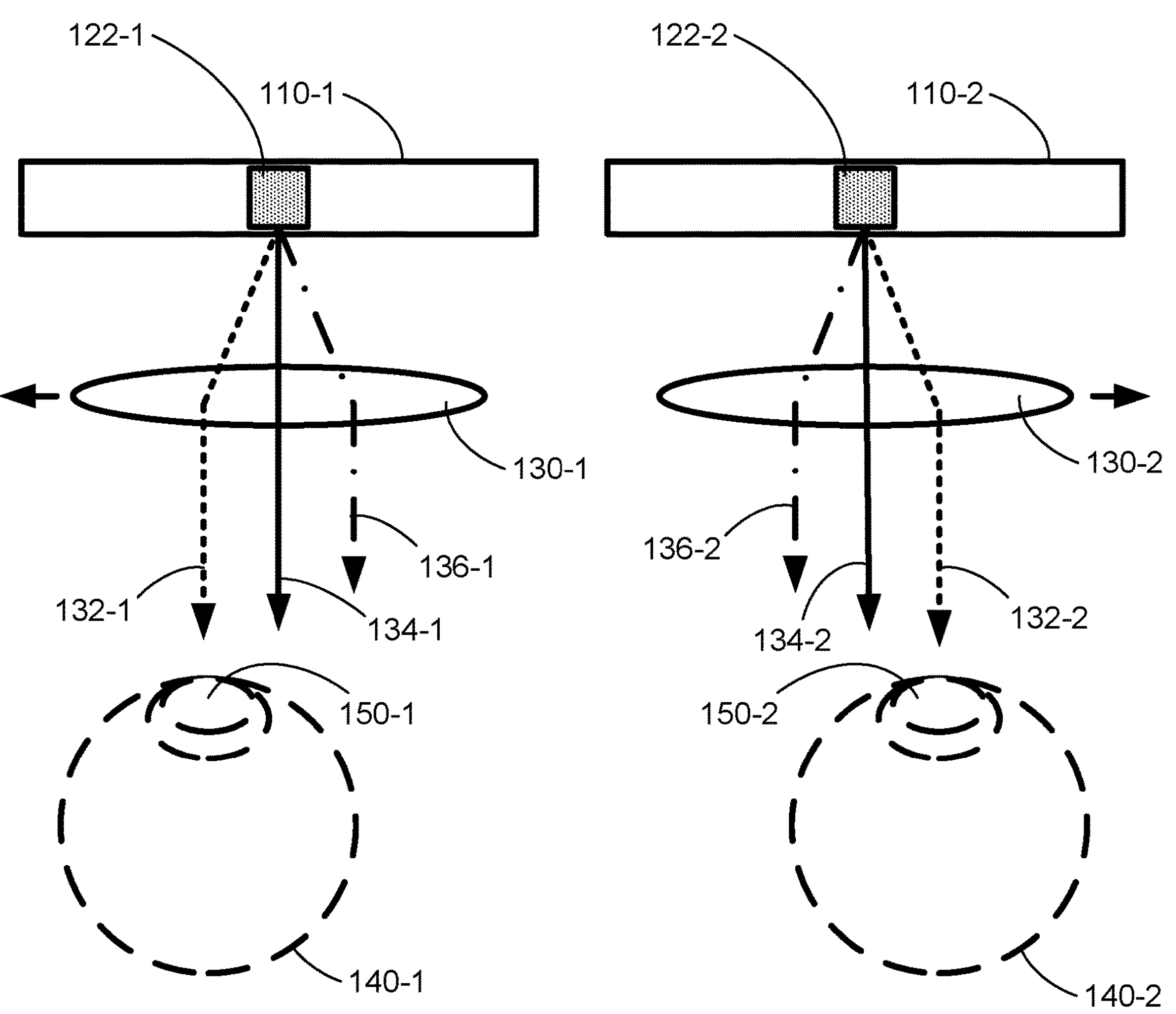
Figure 1E:
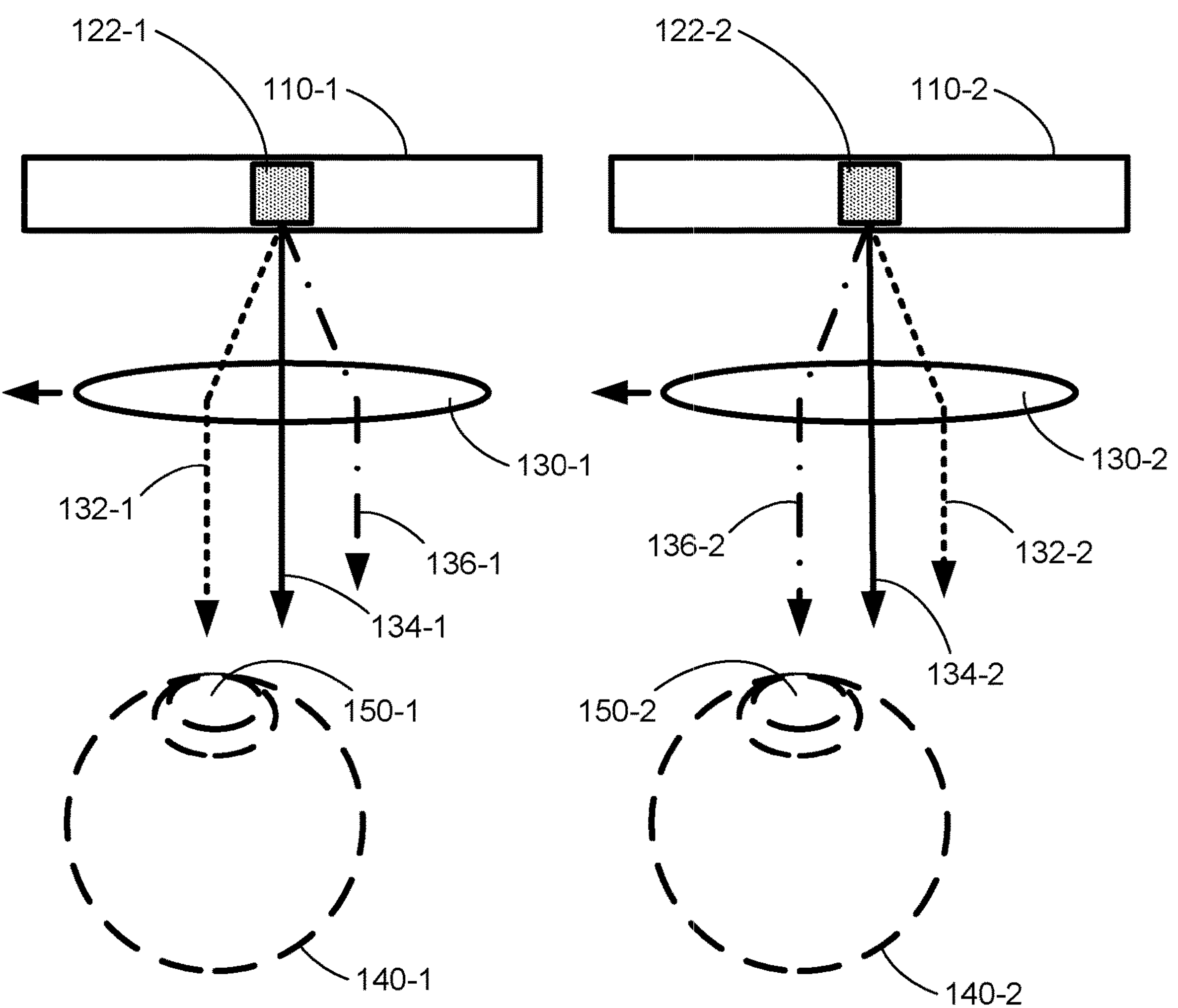

FIGS. 1C-1E are schematic diagrams illustrating example configurations where lenses are not aligned with eyes.

In FIG. 1C, third light 136-1 (e.g., a blue light) enters through pupil 150-1 of eye 140-1. In addition, sixth light 136-2 (e.g., a blue light) enters through pupil 150-2 of eye 140-2. FIG. 1C also shows that first light 132-1 (e.g., a red light) and second light 134-1 (e.g., a green light) do not enter through pupil 150-1 of eye 140-1, and fourth light 132-2 (e.g., a red light) and fifth light 134-2 (e.g., a green light) do not enter through pupil 150-2 of eye 140-2. Third light 136-1 (e.g., a blue light) received with eye 140-1 indicates that a lateral position of lens 130-1 is located on the left side of a lateral position of eye 140-1, and sixth light 136-2 (e.g., a blue light) received with eye 140-2 indicates that a lateral position of lens 130-2 is located on the right side of a lateral position of eye 140-2.

When lens 130-1 and lens 130-2 are included in a head-mounted display device, this indicates that the head-mounted display device is configured for an interpupillary distance shorter than the interpupillary distance of the user. Thus, the user can adjust the distance between lens 130-1 and lens 130-2 (e.g., increasing an interpupillary distance setting for the head-mounted display device) until second light 134-1 (e.g., a green light) is received with eye 140-1 and fifth light 134-2 (e.g., a green light) is received with eye 140-2, as shown in FIG. 1B.

In FIG. 1D, first light 132-1 (e.g., a red light) enters through pupil 150-1 of eye 140-1. In addition, fourth light 132-2 (e.g., a red light) enters through pupil 150-2 of eye 140-2. FIG. 1D also shows that second light 134-1 (e.g., a green light) and third light 136-1 (e.g., a blue light) do not enter through pupil 150-1 of eye 140-1, and fifth light 134-2 (e.g., a green light) and sixth light 136-2 (e.g., a blue light) do not enter through pupil 150-2 of eye 140-2. First light 132-1 (e.g., a red light) received with eye 140-1 indicates that a lateral position of lens 130-1 is located on the right side of a lateral position of eye 140-1, and fourth light 132-2 (e.g., a red light) received with eye 140-2 indicates that a lateral position of lens 130-2 is located on the left side of a lateral position of eye 140-2.

When lens 130-1 and lens 130-2 are included in a head-mounted display device, this indicates that the head-mounted display device is configured for an interpupillary distance longer than the interpupillary distance of the user. Thus, the user can adjust the distance between lens 130-1 and lens 130-2 (e.g., decreasing an interpupillary distance setting for the head-mounted display device) until second light 134-1 (e.g., a green light) is received with eye 140-1 and fifth light 134-2 (e.g., a green light) is received with eye 140-2, as shown in FIG. 1B.

In FIG. 1E, first light 132-1 (e.g., a red light) enters through pupil 150-1 of eye 140-1. In addition, sixth light 132-2 (e.g., a blue light) enters through pupil 150-2 of eye 140-2. FIG. 1E also shows that second light 134-1 (e.g., a green light) and third light 136-1 (e.g., a blue light) do not enter through pupil 150-1 of eye 140-1, and fourth light 132-2 (e.g., a red light) and fifth light 134-2 (e.g., a green light) do not enter through pupil 150-2 of eye 140-2. First light 132-1 (e.g., a red light) received with eye 140-1 indicates that a lateral position of lens 130-1 is located on the right side of a lateral position of eye 140-1, and sixth light 132-2 (e.g., a blue light) received with eye 140-2 indicates that a lateral position of lens 130-2 is located on the right side of a lateral position of eye 140-2.

When lens 130-1 and lens 130-2 are included in a head-mounted display device, this indicates that the head-mounted display device is positioned off toward a right side of the user. Thus, the user can reposition the head-mounted display device on the user's head (e.g., push the head-mounted display device toward a left side of the user's head) until second light 134-1 (e.g., a green light) is received with eye 140-1 and fifth light 134-2 (e.g., a green light) is received with eye 140-2, as shown in FIG. 1B.

Although FIGS. 1B-1E illustrate that the fourth direction corresponds to the third direction and the sixth direction corresponds to the first direction (e.g., for each lens, the red light is projected toward an outside of the head-mounted display and the blue light is projected toward an inside of the head-mounted display), in some embodiments, the fourth direction corresponds to the first direction and the sixth direction corresponds to the third direction (e.g., for each lens, the red light is projected toward a left side of the head-mounted display and the blue light is projected toward a right side of the head-mounted display).

Although FIGS. 1B-1E described that first light 132-1, second light 134-1, third light 136-1, fourth light 132-2, fifth light 134-2, and sixth light 136-2 have certain colors, additionally or alternatively, first light 132-1, second light 134-1, third light 136-1, fourth light 132-2, fifth light 134-2, and sixth light 136-2 have a respective time-dependent intensity pattern (e.g., a pulsing frequency, a duty cycle, and/or an interval). For example, first light 132-1 has a first pulsing frequency (e.g., first light 132-1 pulses at the first pulsing frequency), second light 134-1 has a second pulsing frequency (e.g., second light 134-1 pulses at the second pulsing frequency), third light 136-1 has a third pulsing frequency (e.g., third light 136-1 pulses at the third pulsing frequency), fourth light 132-2 has a fourth pulsing frequency (e.g., fourth light 132-2 pulses at the fourth pulsing frequency), fifth light 134-2 has a fifth pulsing frequency (e.g., fifth light 134-2 pulses at the fifth pulsing frequency), and sixth light 136-2 has a sixth pulsing frequency (e.g., sixth light 136-2 pulses at the sixth pulsing frequency). The pulsing frequencies of first light 132-1, second light 134-1, third light 136-1, fourth light 132-2, fifth light 134-2, and sixth light 136-2 can be used to determine whether lens 130-1 is aligned with eye 140-1 and lens 130-2 is aligned with eye 140-2. In some embodiments, one or more of first light 132-1, second light 134-1, third light 136-1, fourth light 132-2, fifth light 134-2, and sixth light 136-2 have a respective time-independent intensity pattern.

In some embodiments, the device illustrated in FIGS. 1B-1E is used to determine an interpupillary distance (e.g., the interpupillary distance is determined from the positions of lenses 130-1 and 130-2 when both lenses 130-1 and 130-2 are aligned with eyes 140-1 and 140-2). Thus, in some embodiments, the device can be used as a device for measuring an interpupillary distance. In some embodiments, the device is included in, and/or coupled with, another optical device (e.g., a head-mounted display device as shown in FIG. 1R, an optical microscope, binoculars, etc.) to adjust the optical device to match the interpupillary distance.

In addition, although FIGS. 1B-1E illustrate adjusting positions of two lenses (e.g., adjusting an interpupillary distance, which frequently involves moving both lenses), it is possible to use an analogous method for adjusting a position of a single lens of a single lens system (e.g., a display system configured to operate with a single eye only), or separately adjusting a position of an individual lens of a multi-lens system.

Although FIGS. 1B-1E illustrate the use of six light components (e.g., first light 132-1, second light 134-1, third light 136-1, fourth light 132-2, fifth light 134-2, and sixth light 136-2), in some embodiments, fewer or more light components can be used. For example, in some embodiments, both the first light and the third light have a same color (e.g., red) and the third light has a distinct color (e.g., green). In such embodiments, a light source device does not need to emit a light of a third color (e.g., a blue light). Thus, in some cases, a light of a first color (e.g., a green light) received with eye 140-1 indicates that a lateral position of lens 130-1 is aligned with a lateral position of eye 140-1, and a light of a second color (e.g., a red light) received with eye 140-1 indicates that a lateral position of lens 130-1 is not aligned with a lateral position of eye 140-1 without indicating a direction of the misalignment (or in which direction lens 130-1 should move to match the lateral position of eye 140-1). In some embodiments, light source device 122-1 emits light of four or more colors. This provides an additional resolution in adjusting the lateral position of lens 130-1. In some embodiments, light source device 122-1 emits light having a continuous spectrum of colors as described below with FIGS. 1H-1I.

FIGS. 1F-1K are schematic diagrams illustrating example light source devices in accordance with some embodiments.

Figure 1F:
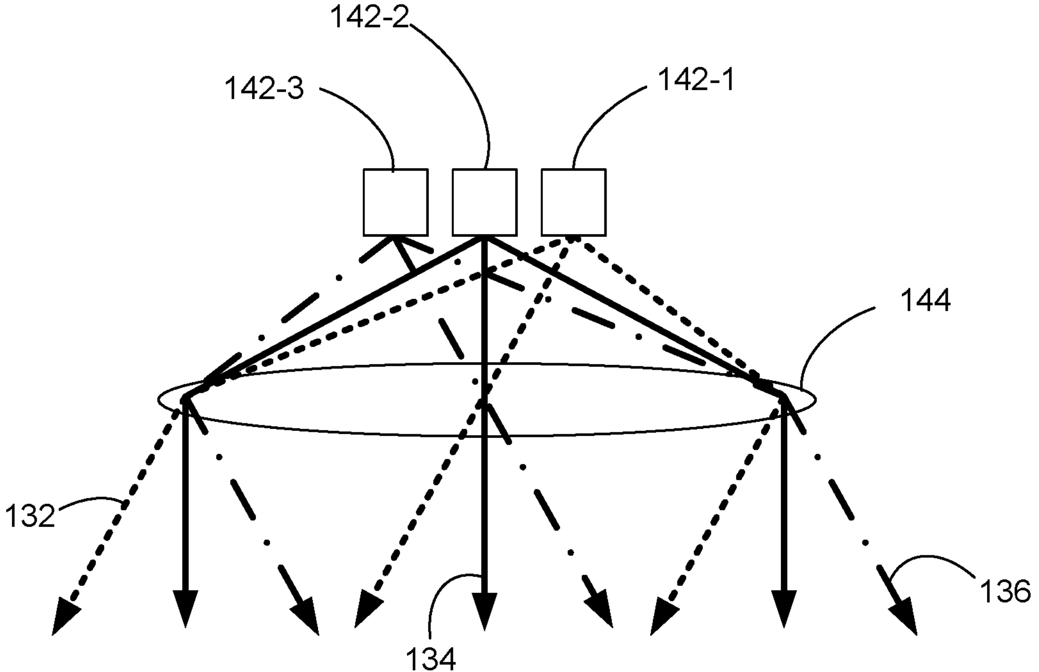
FIGS. 1F-1K are schematic diagrams illustrating example light source devices in accordance with some embodiments.

FIG. 1F shows a light source device that includes first light emitting component 142-1, second light emitting component 142-2, and third light emitting component 142-3. In some embodiments, each light emitting component is an LED, an organic LED (OLED), an array of LED and/or OLED, or a combination thereof.

In some embodiments, the light source device includes more or fewer light emitting components. First light emitting component 142-1 is configured to emit a first light, second light emitting component 142-2 is configured to emit a second light, and third light emitting component 142-3 is configured to emit a third light. In some embodiments, the first light has a first color (e.g., red) and/or a first time-dependent intensity pattern (e.g., a first pulsing frequency, a first duty cycle, and/or a first interval), the second light has a second color (e.g., green) and/or a second time-dependent intensity pattern (e.g., a second pulsing frequency, a second duty cycle, and/or a second interval), and the third light has a third color (e.g., blue) and/or a third time-dependent intensity pattern (e.g., a third pulsing frequency, a third duty cycle, and/or a third interval).

In some embodiments, first light emitting component 142-1, second light emitting component 142-2, and third light emitting component 142-3 are positioned on a focal plane of lens 144, as shown in FIG. 1F. In addition, first light emitting component 142-1, second light emitting component 142-2, and third light emitting component 142-3 are laterally offset from one another.

In some embodiments, lens 144 is rotationally symmetric (e.g., lens 144 is a spherical lens). In some embodiments, lens 144 is reflectionally symmetric (e.g., lens 144 is a cylindrical lens). In some embodiments, lens 144 is a two-dimensional lens (e.g., lens 144 is a spherical lens). In some embodiments, lens 144 is a one-dimensional lens (e.g., lens 144 is a cylindrical lens).

FIG. 1F also shows that first light emitting component 142-1 emits light in multiple directions, and the light from first light emitting component 142-1 is directed to a first direction after passing through lens 144. Second light emitting component 142-2 emits light in multiple directions, and the light from second light emitting component 142-2 is directed to a second direction after passing through lens 144. Third light emitting component 142-3 emits light in multiple directions, and the light from third light emitting component 142-3 is directed to a third direction after passing through lens 144. Thus, the light emitting device shown in FIG. 1F is configured to transmit first light 132 in a first direction, second light 134 in a second direction, and third light 136 in a third direction.

Figure 1G:
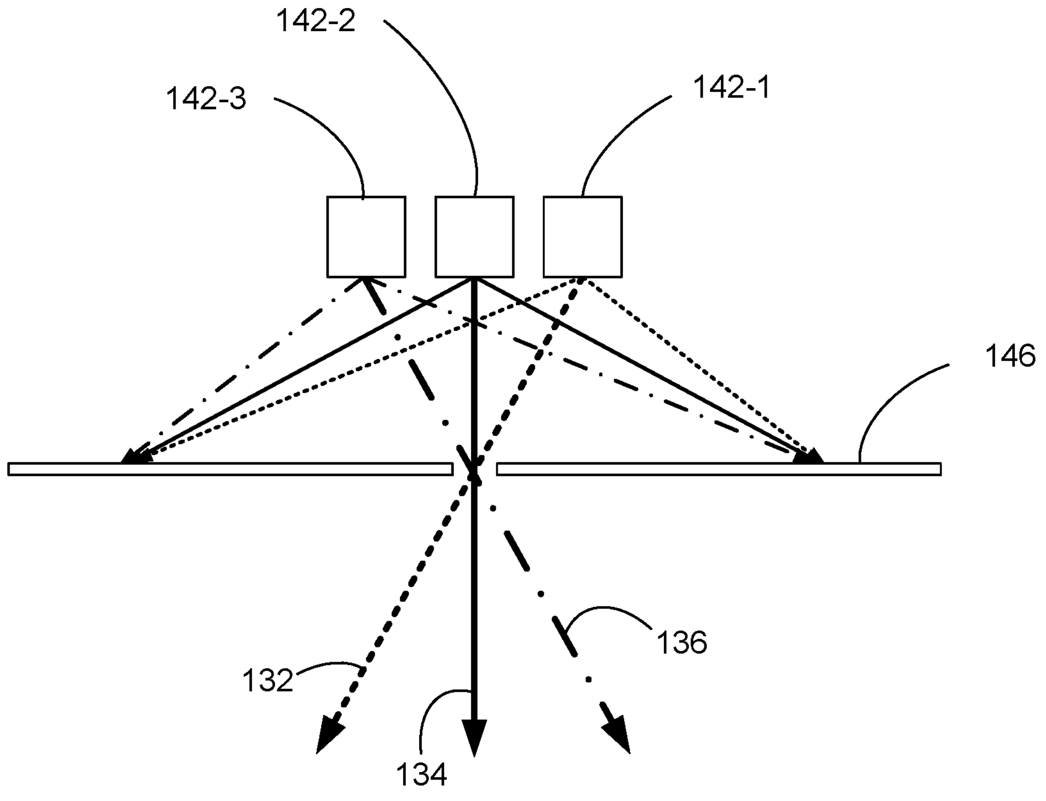

FIG. 1G shows a light source device that includes first light emitting component 142-1, second light emitting component 142-2, and third light emitting component 142-3. First light emitting component 142-1, second light emitting component 142-2, and third light emitting component 142-3 are described above with respect to FIG. 1F.

The light source device includes barrier 146 with an opening. In some embodiments, the opening is a pinhole. In some embodiments, the opening is a slit. The opening of barrier 146 transmits light having a particular direction from each light emitting component. For example, light from light emitting component 142-1 that is not directed to the opening is blocked by barrier 146. Thus, the light emitting device shown in FIG. 1G is configured to transmit first light 132 in a first direction, second light 134 in a second direction, and third light 136 in a third direction.

Figure 1H:
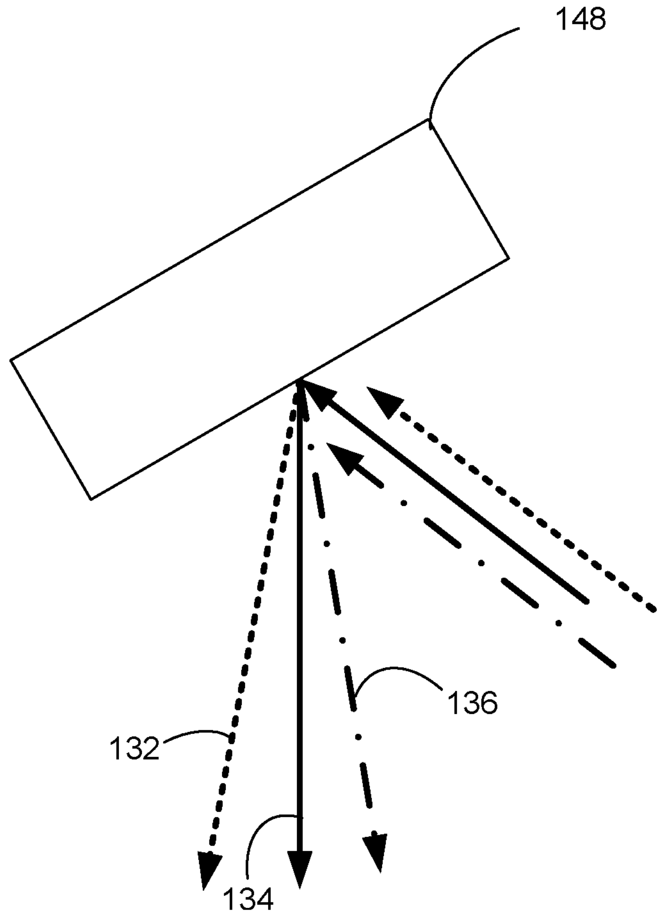

FIG. 1H shows a light source device that includes optical grating 148. In FIG. 1H, optical grating 148 receives a light that includes multiple color components (e.g., the light includes two or more of a red light component, a green light component or a blue light component). In some embodiments, the light source device receives a white light. Optical grating 148 disperses the light components based on their respective wavelengths. For example, as shown in FIG. 1H, optical grating 148 disperses first light 132 into a first direction, second light 134 into a second direction, and third light 136 into a third direction. In some embodiments, the light source device also includes a light source configured to provides the light with multiple color components (e.g., a broadband light source, such as an incandescent bulb, and a superluminescent light emitting diode, or a combination of multiple colored light emitting components shown in FIG. 1F).

Figure 1I:
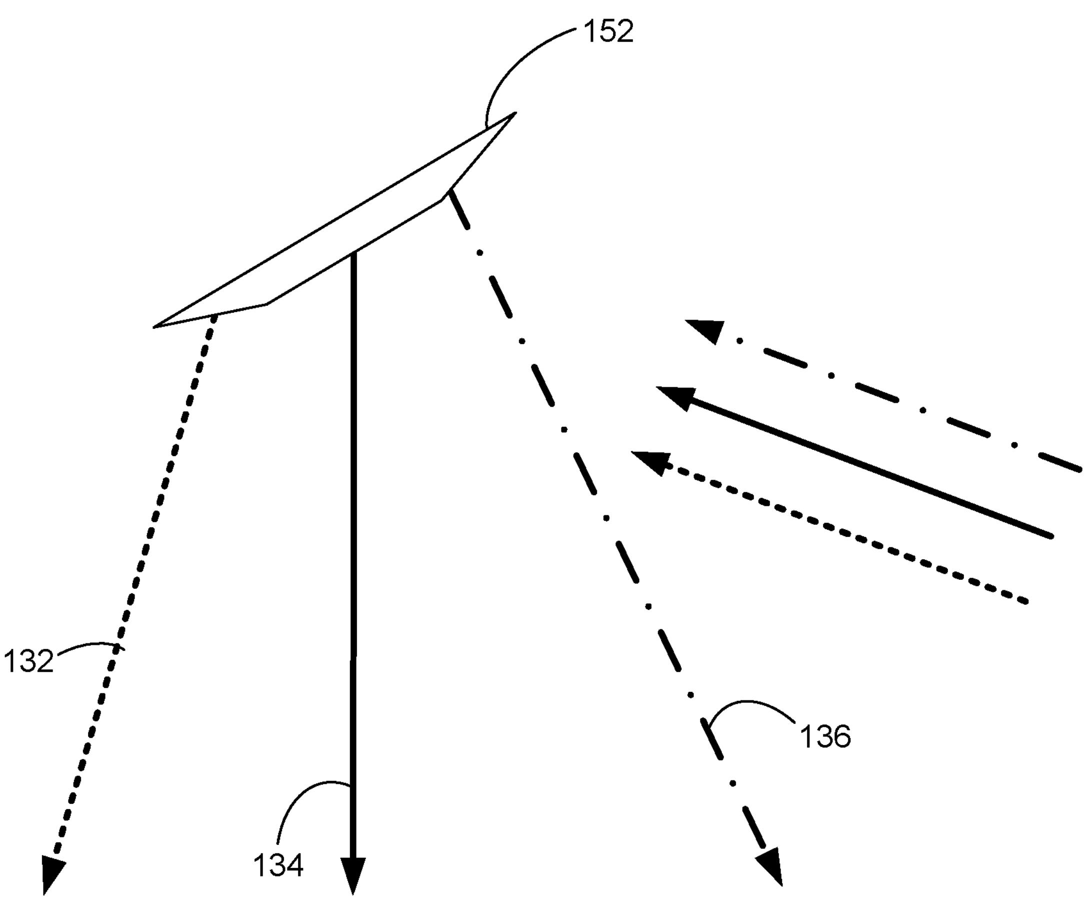

FIG. 1I is similar to FIG. 1H, except that set 152 of dichroic mirrors is used. In some embodiments, set 152 of dichroic mirrors include a single multi-faceted component, where each dichroic mirror is located on a respective facet. Each dichroic mirror is configured to reflect a light having a particular wavelength (or a range of wavelengths). Thus, the light emitting device shown in FIG. 1G is configured to direct first light 132 in a first direction, second light 134 in a second direction, and third light 136 in a third direction.

Figure 1J:
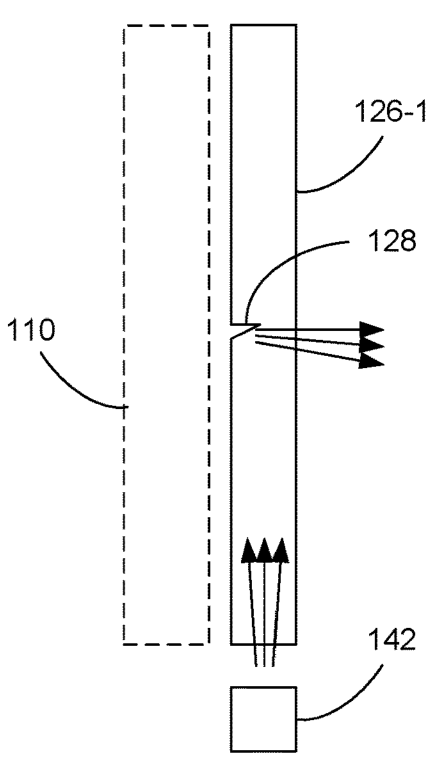

FIG. 1J shows a light source device that includes light guide 126-1 (e.g., an optical fiber) coupled with light emitting component 142 (e.g., a light emitting diode). Light from light emitting component 142 travels through light guide 126-1. As shown in FIG. 1J, light guide 126-1 has extraction feature 128. In some embodiments, extraction feature 128 is an indentation prism. A portion of light traveling through light guide 126-1 is leaked, or emitted, from light guide 126-1 through extraction feature 128. Based on the shape of extraction feature 128, the emitted light is directed to a particular direction (e.g., by adjusting the angle of the indentation prism, the emitted light can be directed to a particular direction). In some embodiments, light guide 126-1 is made of a material that is transparent to visible light. Thus, when light guide 126-1 is placed over light emission device array 110, the presence of light guide 126-1 is typically not perceived by a user (e.g., light guide 126-1 is not visible to the user). In addition, extraction feature 128 is configured so that extraction feature 128 does not visibly interfere with light emitted by light emission device array 110. For example, extraction feature 128 is sized and/or positioned in a way such that extraction feature 128 does not interfere with light emitted by light emission device array 110 (e.g., extraction feature 128 is positioned over a dark region between pixels). The light source device shown in FIG. 1J can be placed over light emission device array 110 without requiring a precise alignment between the light source device and light emission device array 110. Thus, this can facilitate manufacturing of an optical device (e.g., a head-mounted display device).

Figure 1K:
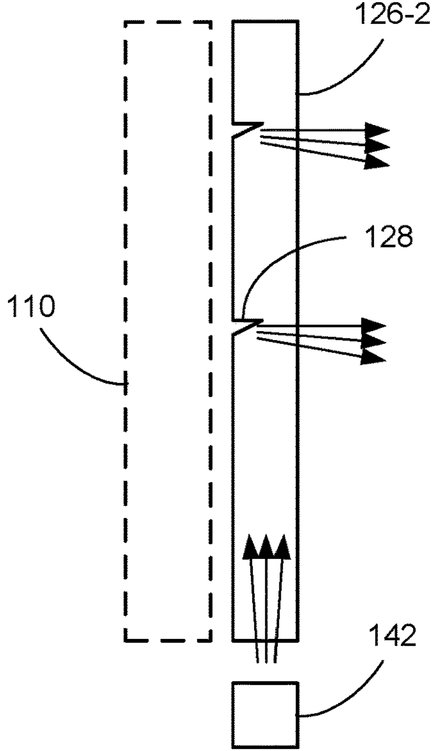

FIG. 1K is similar to FIG. 1J, except that FIG. 1K shows that light guide 126-2 can have multiple extraction features 128. Thus, the light source device shown in FIG. 1K can emit light in multiple locations that correspond to extraction features.

In some embodiments, multiple light source devices are used (e.g., a first light source device coupled with a first light emitting component for a first color and a second light source device coupled with a second light emitting component for a second color). For brevity, such details are omitted herein.

The light source devices shown in FIGS. 1F-1K can be used as described above with respect to FIGS. 1A-1E for determining and/or adjusting an alignment of one or more lenses.

Figure 1L:
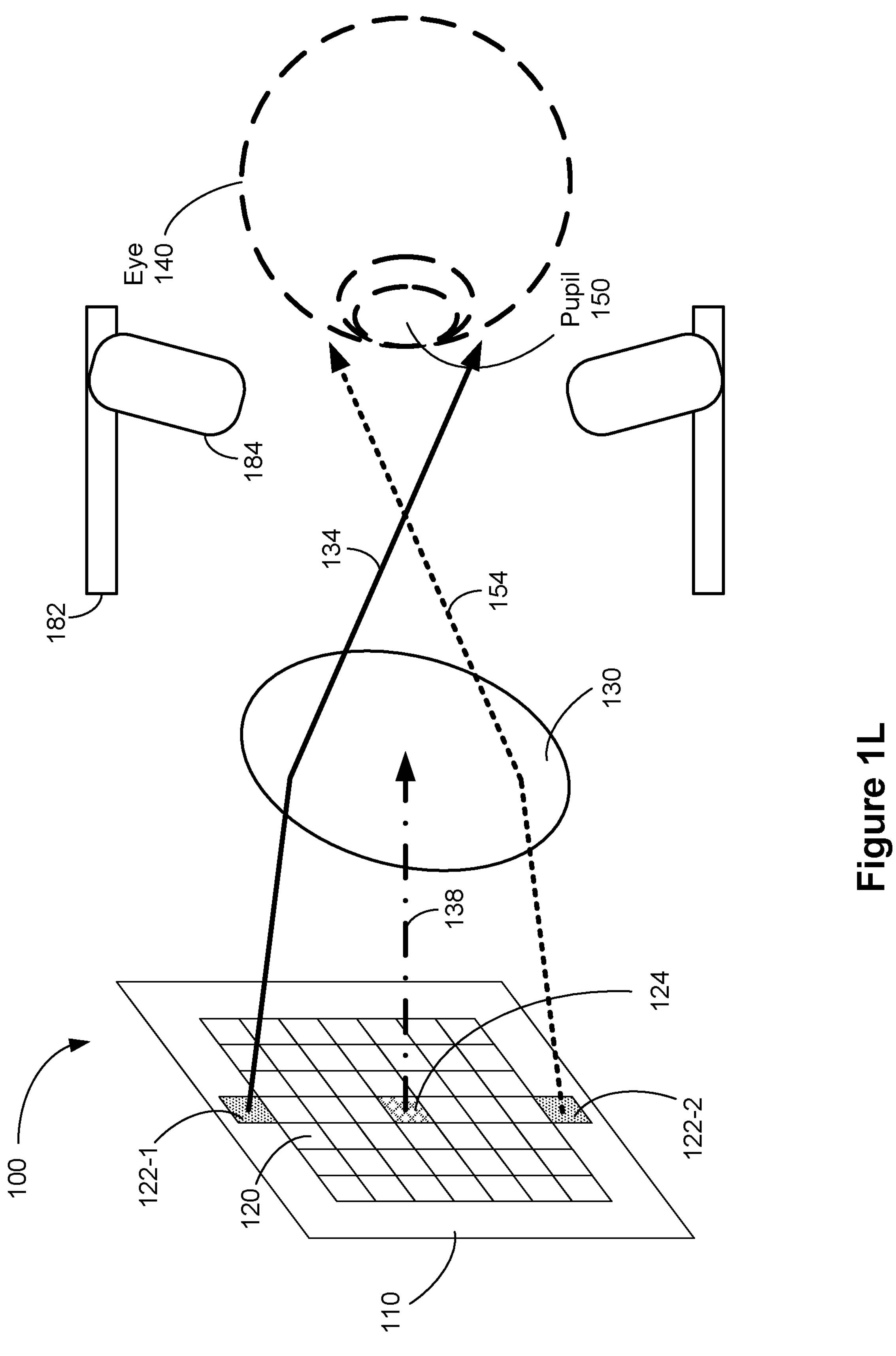
FIGS. 1L-1M are schematic diagrams illustrating a device for providing optical cues for adjusting a distance between an optical element and an eye in accordance with some embodiments.
Figure 1M:
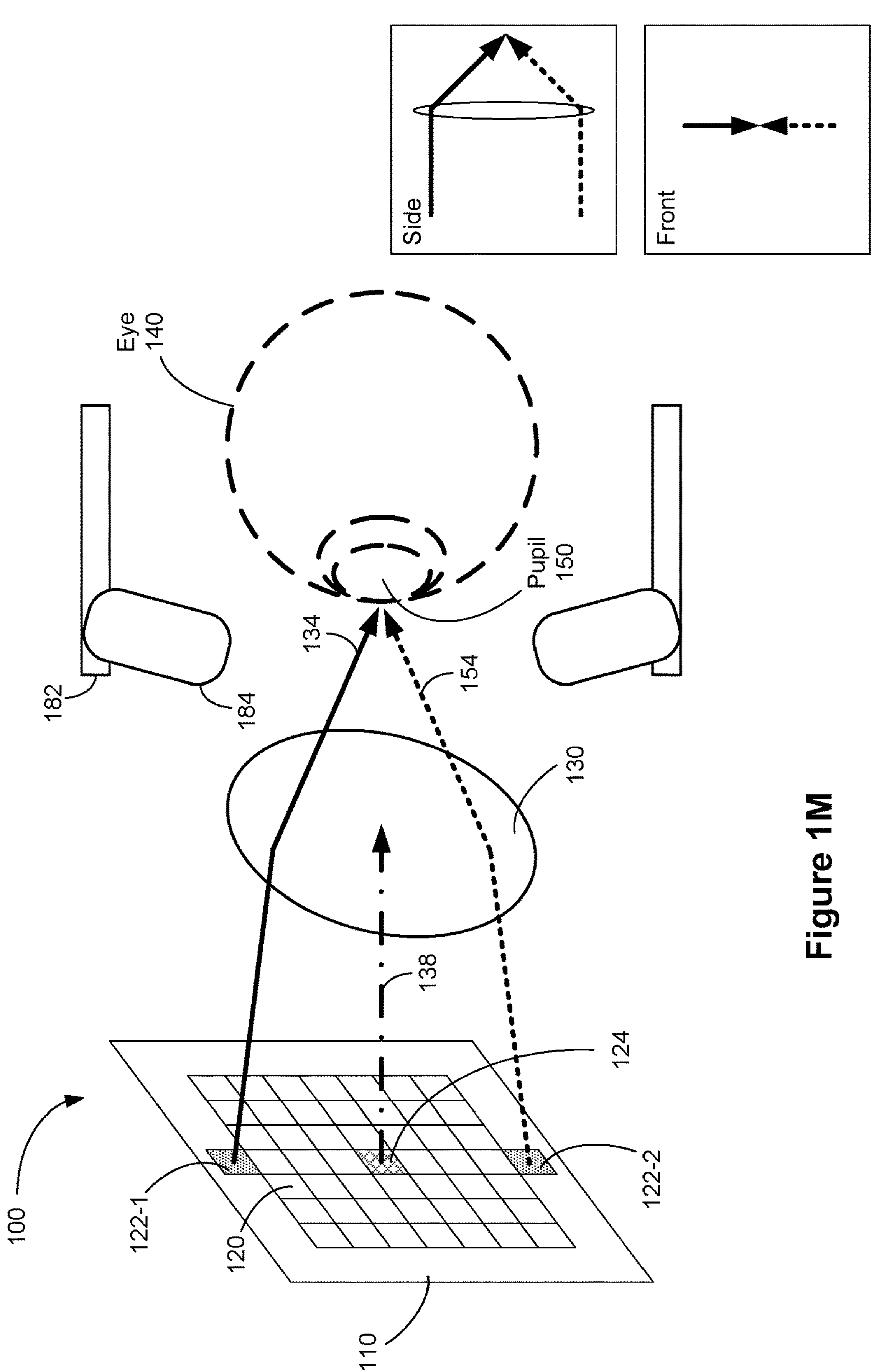

FIGS. 1L-1M are schematic diagrams illustrating a device for providing optical cues for adjusting a distance between an optical element (e.g., lens 130) and eye 140 in accordance with some embodiments.

FIG. 1L illustrates that light source device 122-1 emits light 134 (e.g., a green light) and light source device 122-2 emits light 154 (e.g., a red light). Light 134 and light 154, after lens 130 steers light 134 and light 154, intersect with each other. The location where light 134 intersects with light 154 corresponds to a preselected eye relief (e.g., a design eye relief that corresponds to a position of an eye, for which device 100 is designed).

FIG. 1L also illustrates eye positioning devices 184 (e.g., an eyecup, a goggle frame, a cushion coupled with a goggle frame, etc.). In some embodiments, eye positioning device 184 is configured to provide a mechanical support on a region around an eye of a user (e.g., a portion of a supraorbital region and a portion of a infraorbital region, such as an eyebrow region and a cheek region). Eye positioning device 184 is configured to move so that a distance between eye positioning device 184 and lens 130 can be adjusted. For example, eye positioning device 184 is mounted on rail 182. In some embodiments, eye positioning device 184 is mounted on a thread (e.g., a rotating eyecup). Thus, by moving a position of eye positioning device 184, a distance between an eye located adjacent to positioning device 184 and lens 130 can be changed (this is sometimes referred to as an adjustment of an eye relief).

In some embodiments, eye positioning device 184 is coupled with a mechanical lock that prevents movement of eye positioning device 184 relative to lens 130 when the mechanical lock is engaged. In some embodiments, eye positioning device 184 is configured to require a force above a certain threshold (e.g., based on mechanical friction) in a particular direction for changing a distance between eye positioning device 184 and lens 130 (e.g., a rotating eyecup).

In FIG. 1L, light 134 and light 154 do not enter through pupil 150 of a user. Thus, the user can determine that eye 140 is not located at the preselected eye relief (e.g., a distance between lens 130 and eye 140 does not correspond to a preselected distance between lens 130 and eye 140) based on absence of light 134 and light 154 received through pupil 150.

FIG. 1M illustrates that the position of eye positioning device 184 has changed (e.g., the user has turned a rotating eyecup or slid eye positioning device 184 along rail 182). In FIG. 1M, both light 134 and light 154 enter through pupil 150 of eye 140. Thus, the user can determine that eye 140 is located at the preselected eye relief (e.g., the distance between lens 130 and eye 140 corresponds to the preselected distance between lens 130 and eye 140) based on receiving both light 134 and light 154 through pupil 150.

Insets shown in FIG. 1M illustrate the direction of light 134 and light 154. The inset showing a side view illustrates that light 134 from light source device 122-1 and light 154 from light source device 122-2 are steered by lens 130 so that light 134 intersects with light 154. The inset showing a front view illustrates that light 134 approaches eye 140 from a location above an optical axis of device 100 toward the optical axis of device 100, and light 154 approaches eye 140 from a location below the optical axis of device 100 toward the optical axis of device 100.

Figure 1N:
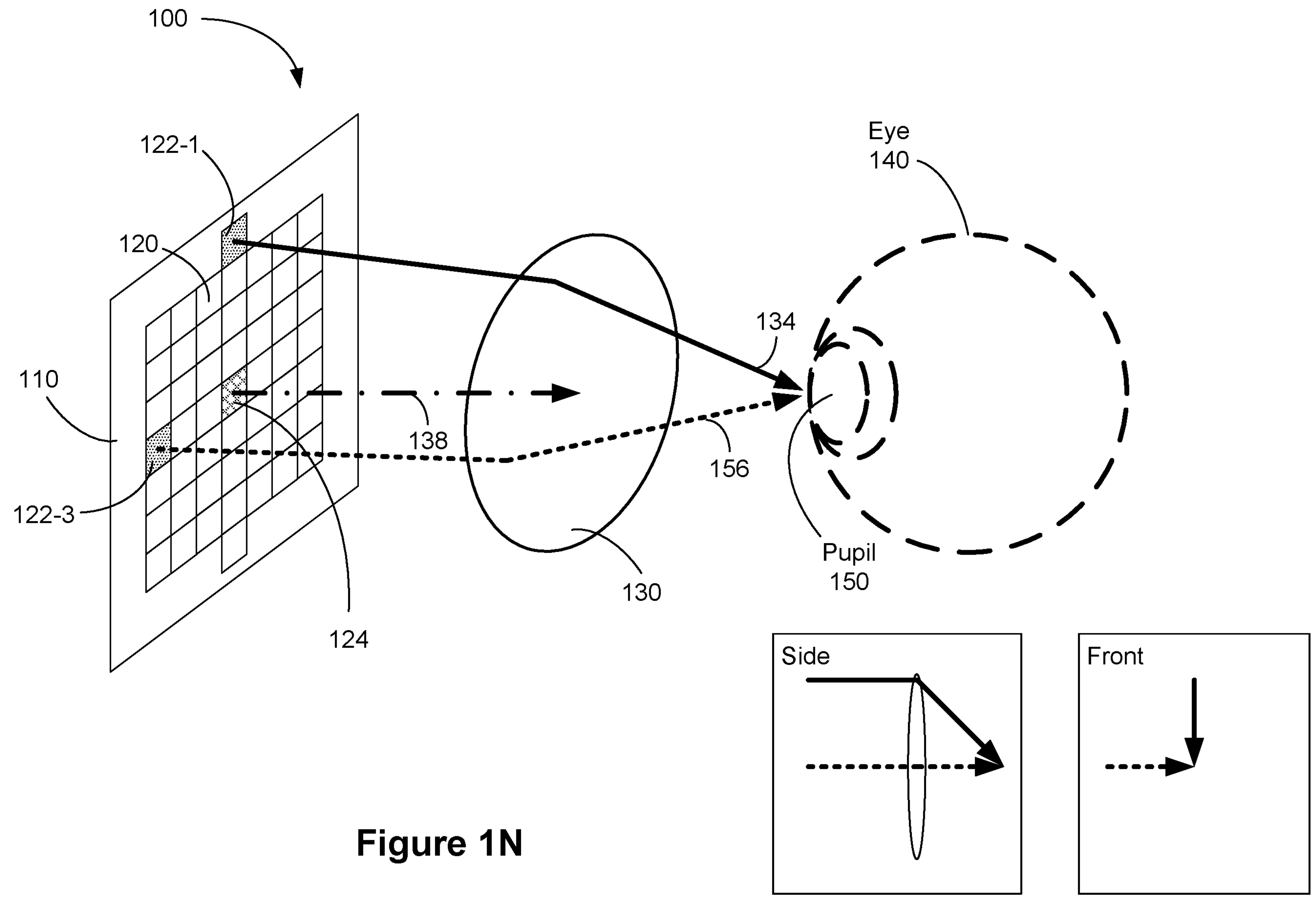
FIG. 1N is a schematic diagram illustrating a device for providing optical cues for adjusting a distance between an optical element and an eye in accordance with some embodiments.

FIG. 1N is similar to FIG. 1M, except that in FIG. 1N, light source device 122-3 is used instead of light source device 122-2 shown in FIG. 1M. Light 156 from light source device 122-3 intersects with light 134, after light 156 and light 134 pass through lens 130, to provide a cue indicating a position corresponding to a preselected eye relief.

Insets shown in FIG. 1N illustrate that light 134 propagates on a first plane (e.g., a vertical plane) and light 156 propagates on a second plane (e.g., a horizontal plane) that is not parallel to the first plane. In some embodiments, the second plane is perpendicular to the first plane as shown in the inset showing a front view.

Figure 1O:
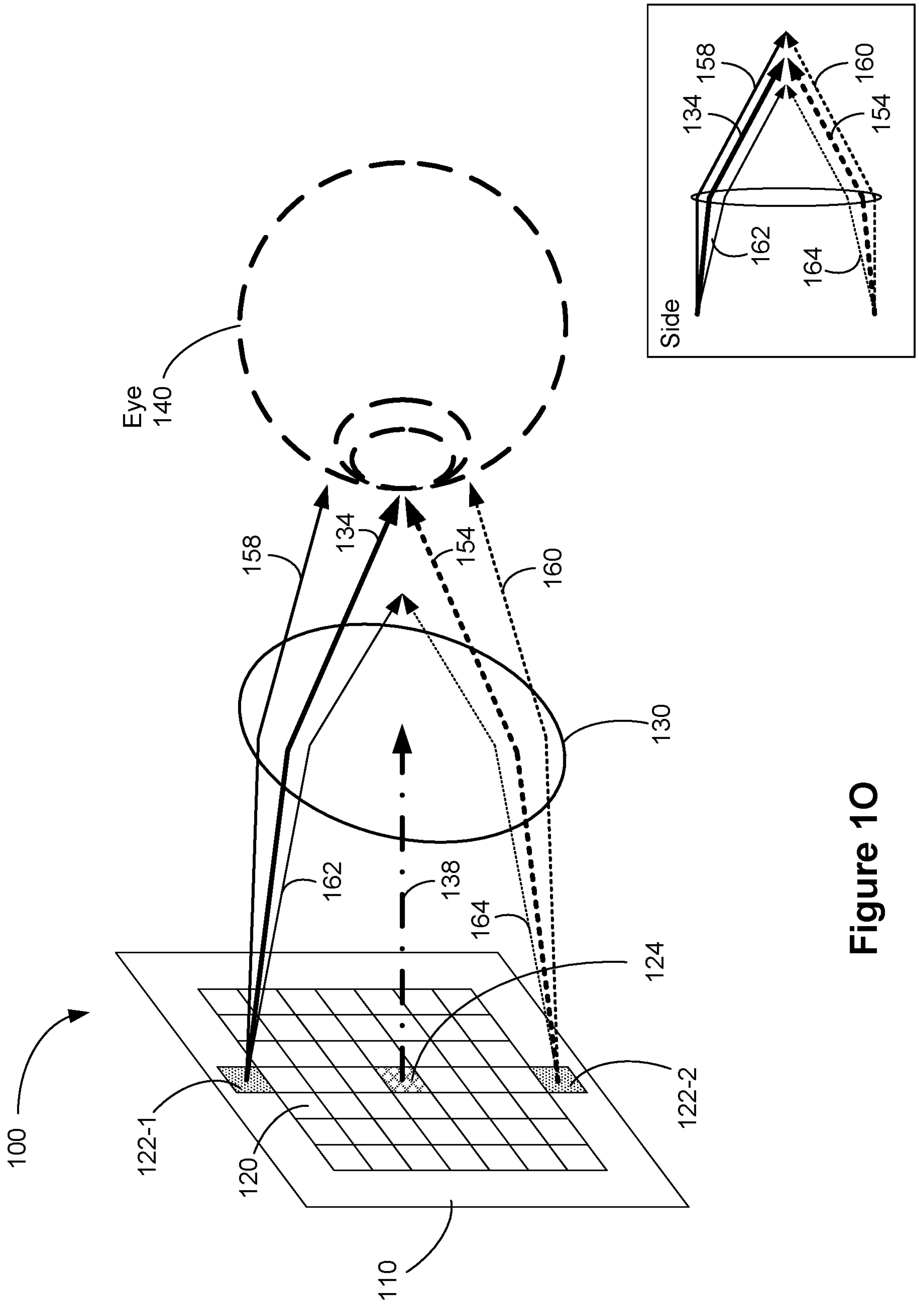
FIGS. 1O-1P are schematic diagrams illustrating a device for providing optical cues for adjusting a distance between an optical element and an eye in accordance with some embodiments.
Figure 1P:
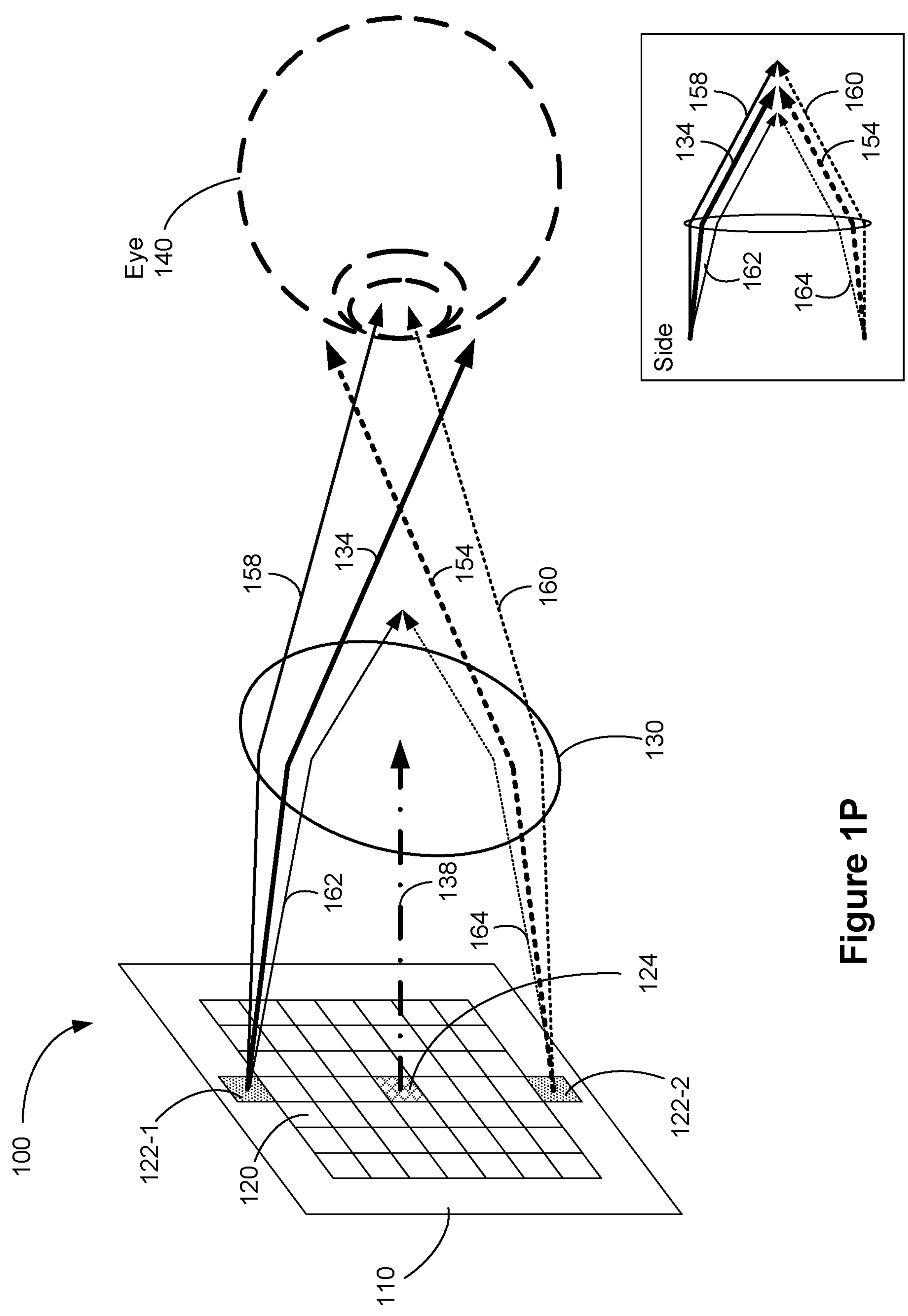

FIGS. 1O-1P are schematic diagrams illustrating a device for providing optical cues for adjusting a distance between an optical element (e.g., lens 130) and eye 140 in accordance with some embodiments.

FIG. 1O is similar to FIG. 1M, except that light source device 122-1 emits light 134, 158, and 162 (e.g., sequentially or concurrently) and light source device 122-2 emits light 154, 160, and 164 (e.g., sequentially or concurrently). In some embodiments, light source device 122-1 emits light 134 concurrently with emission of light 154 by light source device 122-2. In some embodiments, light source device 122-1 emits light 158 concurrently with emission of light 160 by light source device 122-2. In some embodiments, light source device 122-1 emits light 162 concurrently with emission of light 164 by light source device 122-2.

Similar to FIG. 1M, light 134 in FIG. 1O intersects with light 154 at a position that corresponds to a preselected eye relief. Light 162 intersects with light 164 at a position that does not correspond to the preselected eye relief. Light 158 intersects with light 160 at a position that does not correspond to the preselected eye relief.

Thus, as shown in FIG. 1P, when light 158 and light 160 both enter through the pupil of eye 140, the user can determine that eye 140 is not located at the preselected eye relief (e.g., a distance between lens 130 and eye 140 does not correspond to a preselected distance between lens 130 and eye 140) based on receiving both light 158 and light 160 received through the pupil of eye 140. In some embodiments, the color and/or the time-dependent intensity pattern of light 158 and light 160 indicate that a distance between lens 130 and eye 140 is greater than the preselected eye relief, which facilitates adjustment and/or correction of the distance between lens 130 and eye 140. By indicating the direction of the required adjustment, the time required for adjusting the eye relief can be reduced.

Figure 1Q:
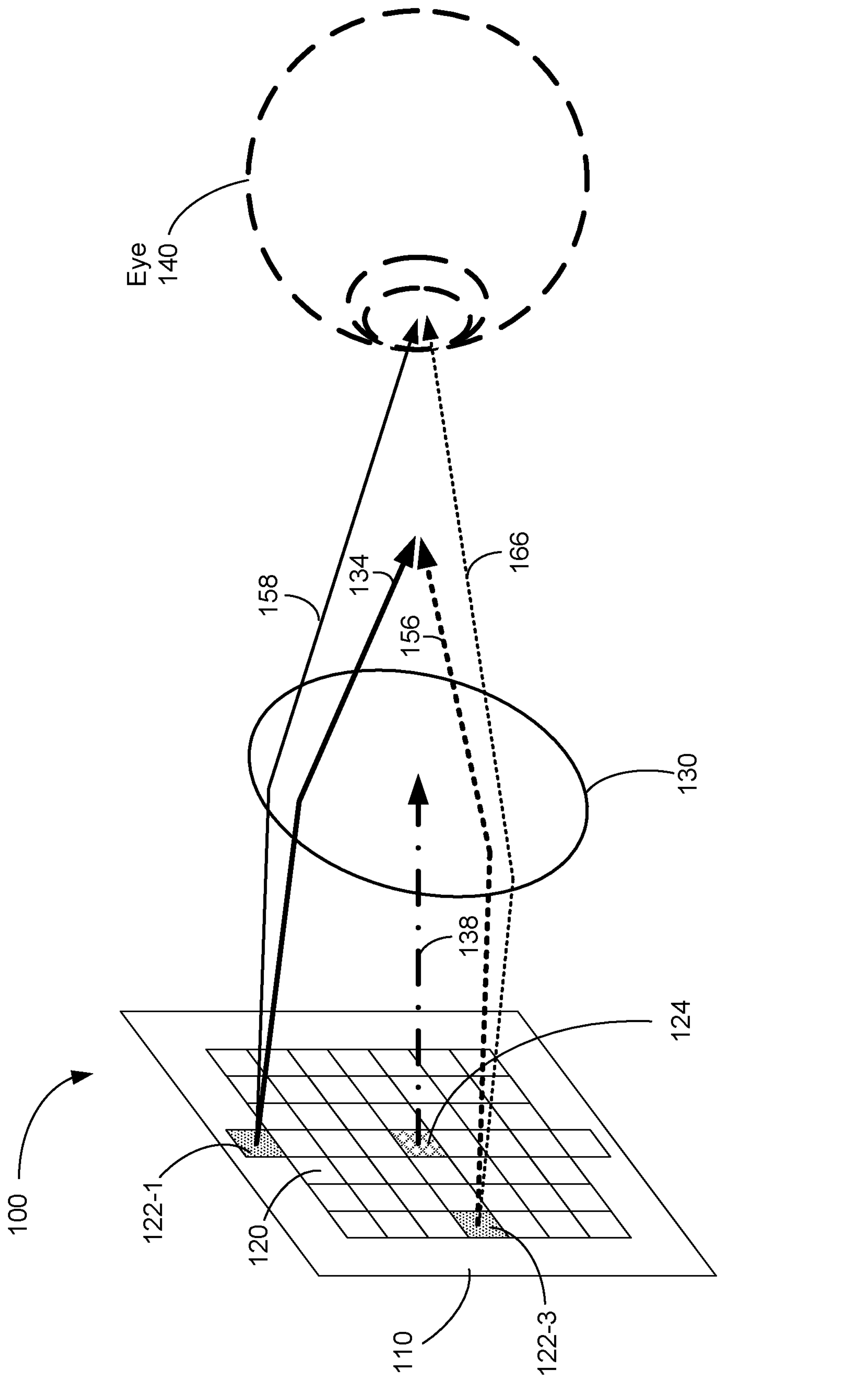
FIG. 1Q is a schematic diagram illustrating a device for providing optical cues for adjusting a distance between an optical element and an eye in accordance with some embodiments.
Figure 1R:
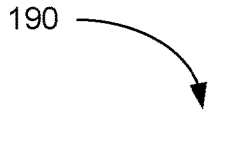
FIG. 1R is a perspective view of a device in accordance with some embodiments.
Figure 1R:
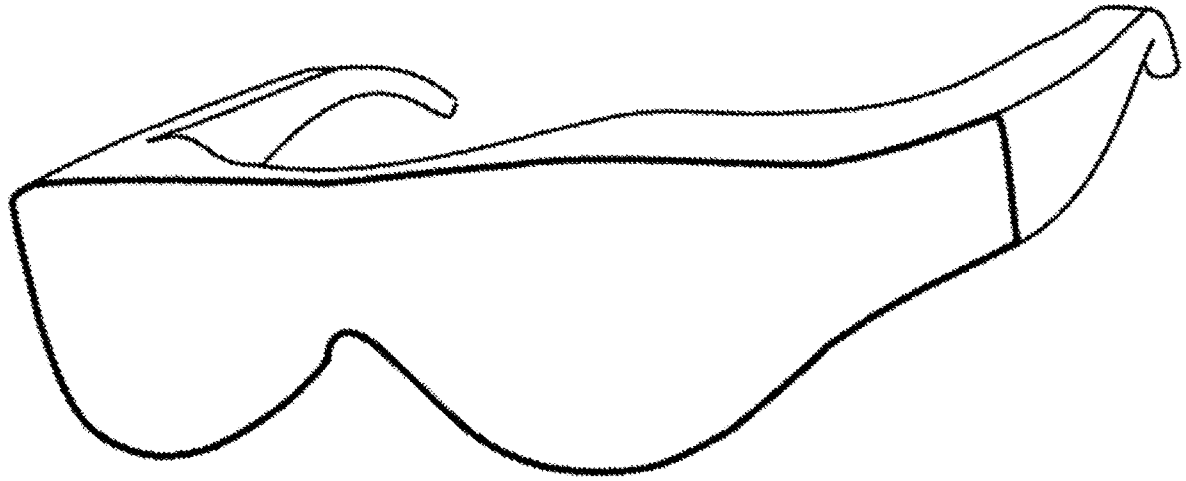

FIG. 1Q is a schematic diagram illustrating a device for providing optical cues for adjusting a distance between an optical element (e.g., lens 130) and eye 140 in accordance with some embodiments.

FIG. 1Q is similar to FIG. 1N, except that light source device 122-1 emits light 158 and light source device 122-3 emits light 168. Light 158 intersects with light 168 at a position, which provides a cue indicating that the position where light 158 intersects with light 168 does not correspond to the preselected eye relief.

FIG. 1R illustrates display device 190 in accordance with some embodiments. In some embodiments, display device 190 is configured to be worn on a head of a user (e.g., by having the form of spectacles or eyeglasses, as shown in FIG. 1R) or to be included as part of a helmet that is to be worn by the user. When display device 190 is configured to be worn on a head of a user or to be included as part of a helmet, display device 190 is called a head-mounted display. Alternatively, display device 190 is configured for placement in proximity of an eye or eyes of the user at a fixed location, without being head-mounted (e.g., display device 190 is mounted in a vehicle, such as a car or an airplane, for placement in front of an eye or eyes of the user).

In some embodiments, display device 190 includes one or more components described below with respect to FIG. 2. In some embodiments, display device 190 includes additional components not shown in FIG. 2.

Figure 2:
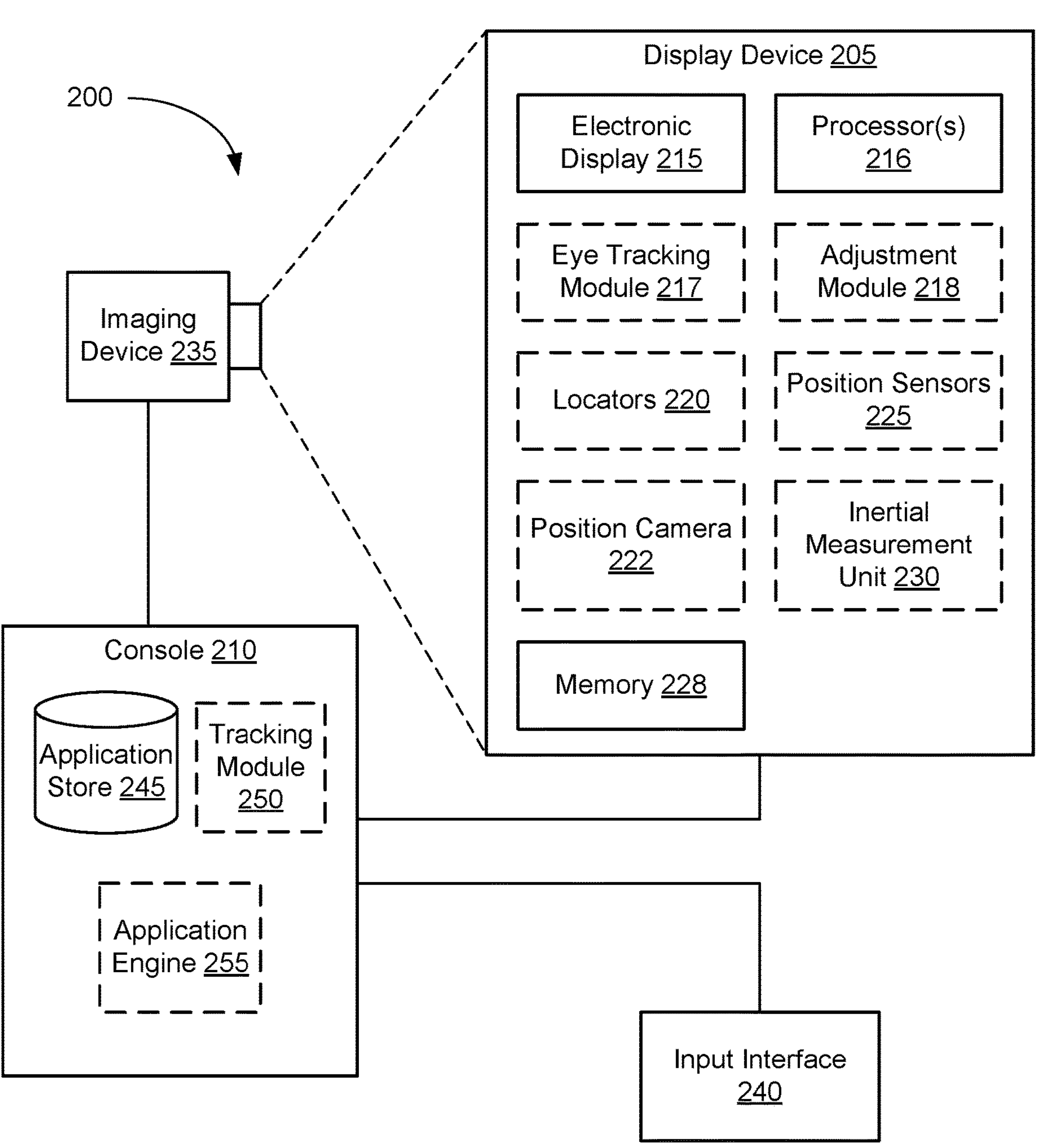
FIG. 2 is a block diagram of a system including a display device in accordance with some embodiments.

FIG. 2 is a block diagram of system 200 in accordance with some embodiments. The system 200 shown in FIG. 2 includes display device 205 (which corresponds to display device 190 shown in FIG. 1R), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and augmented reality.

In some embodiments, as shown in FIG. 1R, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an AR device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user).

In some embodiments, the display element includes one or more light emission devices and a corresponding array of emission intensity array. An emission intensity array is an array of electro-optic pixels, opto-electronic pixels, some other array of devices that dynamically adjust the amount of light transmitted by each device, or some combination thereof. These pixels are placed behind one or more lenses. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. In some embodiments, this sends a discrete image to the display that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

In light of these principles, we now turn to certain embodiments.

In accordance with some embodiments, a device includes a first light source device (e.g., light source device 122-1 in FIG. 1B) configured to transmit a first light (e.g., first light 132-1) in a first direction and a second light (e.g., second light 132-2) in a second direction that is distinct from the first direction. The device also includes a first set of one or more lenses (e.g., lens 130-1 in FIG. 1B) configured for directing the first light and the second light from the first light source device toward a first eye of a user. The first light is spatially offset from the second light (e.g., first light 132-1 is spatially offset from second light 134-1 as shown in FIG. 1B). One or more of the first light and the second light provide a cue for adjusting a location (e.g., a lateral location) of the first set of one or more lenses.

In some embodiments, the first light indicates that an eye receiving the first light is offset from a center of the first set of one or more lenses (e.g., as shown in FIG. 1D, when eye 140-1 receives first light 132-1, this indicates that eye 140-1 is offset from a lateral position of a center of lens 130-1). The second light indicates that an eye receiving the second light is aligned with the center of the first set of one or more lenses (e.g., as shown in FIG. 1B, when eye 140-1 receives second light 134-1, this indicates that eye 140-1 is aligned with the lateral position of the center of lens 130-1).

In some embodiments, the first light directed to the first eye is parallel to the second light directed to the first eye (e.g., in FIG. 1B, first light 132-1 is parallel to second light 134-1 after passing through lens 130-1).

In some embodiments, the first light source device is further configured to transmit a third light in a third direction that is distinct from the first direction and the second direction; and the first set of one or more lenses is further configured for directing the third light toward the first eye (e.g., in FIG. 1B, third light 136-1). The third light is spatially offset from the first light and the second light.

In some embodiments, the first light has a first color (e.g., red), and the second light has a second color (e.g., green) that is distinct from the first color. The first light source device includes a light emitting component configured to provide a broadband light that includes the first light of the first color and the second light of the second color; and an optical grating (e.g., optical grating 148 in FIG. 1H) configured to disperse the broadband light from the light emitting component, including directing the first light of the first color in the first direction and the second light of the second color in the second direction.

In some embodiments, the first light has a first color (e.g., red), and the second light has a second color (e.g., green) that is distinct from the first color. The first light source device includes a light emitting component configured to provide a broadband light that includes the first light of the first color and the second light of the second color; and a plurality of dichroic mirrors (e.g., set 152 of dichroic mirrors in FIG. 1I), including a first dichroic mirror and a second dichroic mirror. The first dichroic mirror is configured to reflect the first light of the first color in the first direction and the second dichroic mirror is configured to reflect the second light of the second color in the second direction.

In some embodiments, the first light source device includes a first light emitting component (e.g., first light emitting component 142-1 in FIG. 1F) configured to provide the first light and a second light emitting component (e.g., second light emitting component 142-2 in FIG. 1F) configured to provide the second light.

In some embodiments, the first light has a first color (e.g., red), and the second light has a second color (e.g., green) that is distinct from the first color.

In some embodiments, the first light has a first time-dependent intensity pattern (e.g., a first pulsing frequency, a first duty cycle, a first interval, etc.) and the second light has a second time-dependent intensity pattern (e.g., a second pulsing frequency, a second duty cycle, a second interval, etc.). In some embodiments, the second time-dependent intensity pattern is distinct from the first time-dependent intensity pattern.

In some embodiments, the first light emitting component is configured to provide the first light in multiple directions, and the second light emitting component is configured to provide the second light in multiple directions (e.g., FIG. 1F). The first light source device also includes one or more lenses (e.g., lens 144 in FIG. 1F). The first light emitting component and the second light emitting component are positioned (e.g., on a focal plane of the one or more lenses) with a lateral offset so that the first light provided by the first light emitting component is directed to the first direction and the second light provided by the second light emitting component is directed to the second direction.

In some embodiments, the first light source device also includes a barrier having an opening (e.g., barrier 146 with a pinhole or a slit, as shown in FIG. 1G) configured to transmit the first light from the first light emitting component in the first direction and the second light from the second light emitting component in the second direction. In some embodiments, the first light emitting component is configured to provide the first light in multiple directions, and the second light emitting component is configured to provide the second light in multiple directions.

In some embodiments, the device includes a second light source device (e.g., second light source device 122-1 in FIG. 1B) configured to transmit a fourth light (e.g., fourth light 132-2 in FIG. 1B) in a fourth direction and a fifth light (e.g., fifth light 134-2 in FIG. 1B) distinct from the fourth light in a fifth direction that is distinct from the fourth direction. The second light source device is distinct from the first light source device. The device also includes a second set of one or more lenses (e.g., lens 130-2 in FIG. 1B) configured for directing the fourth light and the fifth light from the second light source device toward a second eye of the user. The fourth light is spatially offset from the fifth light. One or more of the fourth light and the fifth light provide a cue for adjusting a location (e.g., a lateral location) of the second set of one or more lenses.

In some embodiments, the second light source device is further configured to transmit a sixth light (e.g., sixth light 136-2 in FIG. 1B) in a sixth direction that is distinct from the fourth direction and the fifth direction. The second set of one or more lenses is further configured for directing the sixth light toward the second eye. The sixth light is spatially offset from the fourth light and the fifth light.

In some embodiments, the device also includes one or more display screens (e.g., display screens 110-1 and/or 110-2) configured to project one or more images through the first set of one or more lenses.

In some embodiments, the device is a head-mounted display device (e.g., FIG. 1R).

In accordance with some embodiments, a method includes transmitting a first light (e.g., first light 132-1 in FIG. 1B) in a first direction and a second light (e.g., second light 134-1 in FIG. 1B) that is distinct from the first light in a second direction that is distinct from the first direction; and transmitting the first light and the second light through a first set of one or more lenses and directing the first light and the second light toward a first eye of a user (e.g., FIG. 1B). The first light is spatially offset from the second light and one or more of the first light and the second light provide a cue for adjusting a location of the first set of one or more lenses.

In some embodiments, the method also includes, in conjunction with transmitting the first light and the second light through the first set of one or more lenses (e.g., concurrently with transmitting the first light and the second light through the first set of one or more lenses), transmitting a third light that is distinct and spatially offset from the first light and the second light.

In some embodiments, the method also includes transmitting a fourth light (e.g., fourth light 132-2 in FIG. 1B) in a fourth direction and a fifth light (e.g., fifth light 134-2 in FIG. 1B) that is distinct form the fourth light in a fifth direction that is distinct from the fourth direction; and transmitting the fourth light and the fifth light through a second set of one or more lenses that is distinct from the first set of one or more lenses and directing the fourth light and the fifth light toward a second eye of the user. The fourth light is spatially offset from the fifth light and one or more of the fourth light and the fifth light provide a cue for adjusting a location of the second set of one or more lenses.

In some embodiments, the method also includes, in conjunction with transmitting the first light and the second light through the first set of one or more lenses, transmitting a reference light from one or more display screens through the first set of one or more lenses (e.g., reference light 138). In some embodiments, the reference light has a color and/or a time-dependent intensity pattern of the second light. Thus, the reference light can assist with a determination whether the second light is received by an eye. For example, a color of the reference light and a color of light from a light source device are compared to determine whether the color of the light from the light source device matches the color of the reference light. If the color of the light from the light source device matches the color of the reference light, the lens is aligned with the eye. If the color of the light from the light source device does not match the color of the reference light, the lens is not aligned with the eye. In another example, a pulsing frequency of the reference light and a pulsing frequency of light from a light source device are compared to determine whether the pulsing frequency of the light from the light source device matches the pulsing frequency of the reference light. If the pulsing frequency of the light from the light source device matches the pulsing frequency of the reference light, the lens is aligned with the eye. If the pulsing frequency of the light from the light source device does not match the pulsing frequency of the reference light, the lens is not aligned with the eye.

In accordance with some embodiments, a method includes receiving a portion of a bundle of light that includes a first light and a second light that is distinct from the first light and laterally offset from the first light (e.g., FIG. 1B). The method also includes, in accordance with a determination that the received portion of the bundle of light corresponds to the first light, moving the first set of one or more lenses. For example, when the received portion of the bundle of light has a first color (e.g., in FIG. 1D, the received portion of the bundle of light has a red color, which indicates that lens 130-1 needs to be moved toward a left side to align with eye 140-1), the first set of one or more lenses is moved toward the left side.

In some embodiments, the method further includes continuing to monitor the color of a light received by an eye and adjust a lateral position of the lens (or continuing to monitor the color of a light received by each eye and adjust lateral positions of the first lens and the second lens) until the first lens is accurately positioned (or both the first lens and the second lens are accurately positioned). In some embodiments, an accurate positioning of a lens is indicated by whether a particular light (e.g., having a particular color, such as green, and/or having a particular time-dependent intensity pattern, such as a pulsing frequency, a duty cycle, and/or an interval) is delivered toward a pupil of an eye.

In accordance with some embodiments, a device includes a first light source device configured to transmit a first light in a first direction (e.g., light source device 122-1 in FIG. 1L is configured to emit light 134) and a second light source device configured to transmit a second light in a second direction (e.g., light source device 122-2 in FIG. 1L is configured to emit light 154). In some embodiments, the second direction is distinct from the first direction. The device also includes a first set of one or more lenses (e.g., lens 130) configured for directing, toward a first eye of a user (e.g., a left eye), the first light from the first light source device and the second light from the second light source device so that the first light intersects with the second light at a first location (e.g., in FIG. 1L, light 134 and light 154 intersect with each other). One or more of the first light and the second light provide a cue for adjusting a location of the first set of one or more lenses relative to the first eye of the user (e.g., adjusting a position of the first eye relative to the first set of one or more lenses or adjusting a position of one or more lenses of the first set of one or more lenses relative to the first eye). For example, as shown in FIG. 1L, the user can determine that eye 140 is not located at a position that corresponds to the design eye relief of device 100 based on not receiving both light 134 and light 154 through pupil 150 of eye 140.

In some embodiments, the first light has a first set of properties. The second light has a second set of properties that is distinct from the first set of properties. Each of the first set of properties and the second set of properties is characterized by a color and/or a time-dependent intensity pattern. For example, the first light has a first color and the second light has a second color that is distinct from the first color. In another example, the first light has a first time-dependent intensity pattern (e.g., a pulsing frequency, a duty cycle, and/or an interval) and the second light has a second time-dependent intensity pattern that is distinct from the first time-dependent intensity pattern (e.g., the second light has a pulsing frequency that is distinct from a pulsing frequency of the first light). In some embodiments, the first light has a time-independent intensity pattern (e.g., the intensity of the first light does not change over time), and the second light has a time-dependent intensity pattern (e.g., the intensity of the second light changes over time). In some embodiments, the first light has a time-dependent intensity pattern, and the second light has a time-independent intensity pattern.

In some embodiments, the first light source device is configured to transmit a third light (e.g., light 158 in FIG. 1O) in a third direction that is distinct from at least one of the first direction and the second direction. The second light source device is configured to transmit a fourth light (e.g., light 160 in FIG. 1O) in a fourth direction that is distinct from at least one of the first direction and the second direction. In some embodiments, the fourth direction is distinct from the third direction. The first set of one or more lenses is configured for directing, toward the first eye of the user, the third light from the first light source device and the fourth light from the second light source device so that the third light intersects with the fourth light at a second location that is distinct from the first location (e.g., as shown in the inset of FIG. 1O, light 158 intersects with light 160 at a location that is distinct from a location where light 134 intersects with light 154).

In some embodiments, a path of the first light before passing through the first set of one or more lenses and a path of the first light after passing through the first set of one or more lenses define a first plane. A path of the second light before passing through the first set of one or more lenses and a path of the second light after passing through the first set of one or more lenses define a second plane. The second plane is substantially parallel to the first plane (e.g., the angle between the first plane and the second plane is 20 degrees or less). A path of the third light before passing through the first set of one or more lenses and a path of the third light after passing through the first set of one or more lenses define a third plane. The third plane is substantially parallel to the first plane (e.g., the angle between the first plane and the third plane is 20 degrees or less). For example, in FIG. 1O, the plane defined by light 134 before and after passing through lens 130 is parallel to the plane defined by light 154 before and after passing through lens 130 and the plane defined by light 158 before and after passing through lens 130.

In some embodiments, a path of the first light before passing through the first set of one or more lenses and a path of the first light after passing through the first set of one or more lenses define a first plane. A path of the second light before passing through the first set of one or more lenses and a path of the second light after passing through the first set of one or more lenses define a second plane. The second plane is substantially parallel to the first plane (e.g., the angle between the first plane and the second plane is 20 degrees or less). A path of the third light before passing through the first set of one or more lenses and a path of the third light after passing through the first set of one or more lenses define a third plane. The third plane is substantially perpendicular to the first plane (e.g., the angle between the first plane and the third plane is between 70 degrees and 110 degrees).

In some embodiments, the first light source device is further configured to transmit a fifth light (e.g., light 162 in FIG. 1O) in a fifth direction that is distinct from the first direction and the third direction. The second light source device is further configured to transmit a sixth light (e.g., light 164 in FIG. 1O) in a sixth direction that is distinct from the second direction and the fourth direction. The first set of one or more lenses is further configured for directing the fifth light and the sixth light toward the first eye so that the fifth light intersects with the sixth light at a third location that is distinct from the first location and the second location (e.g., as shown in the inset of FIG. 1O, light 162 intersects with light 164 at a location that is distinct from a location where light 134 intersects with light 154 and a location where light 158 intersects with light 160).

In some embodiments, the first light has a first set of properties. The second light has a second set of properties that is distinct from the first set of properties. The third light has a third set of properties that is distinct from the first set of properties and the second set of properties. The fourth light has a fourth set of properties that is distinct from the first set of properties, the second set of properties, and the third set of properties. Each of the first set of properties, the second set of properties, the third set of properties, and the fourth set of properties is characterized by a color and/or a time-dependent intensity pattern. For example, the first light can be distinguished from the second light, the third light, and the fourth light based on the color and/or the time-dependent intensity pattern; the second light can be distinguished from the third light and the fourth light based on the color and/or the time-dependent intensity pattern; and the third light can be distinguished from the fourth light based on the color and/or the time-dependent intensity pattern.

In some embodiments, the first light source device includes a first light guide with one or more extraction features (e.g., light guide 126-1 in FIG. 1J with extraction feature 128). The second light source device includes a second light guide with one or more extraction features (e.g., another light guide that has a structure corresponding to light guide 126-1). The second light guide is distinct and separate from the first light guide. Each light guide of the first light guide and the second light guide is optically coupled with a respective light emitting component (e.g., the first light guide is coupled with a green LED, and the second light guide is coupled with a red LED).

In some embodiments, the device includes an electronic display (e.g., light emission device array 110). The first light guide and the second light guide are located between the electronic display and the first set of one or more lenses (e.g., as shown in FIG. 1J, the first light guide can be placed over light emission device array 110 so that the first light guide is located between light emission device array 110 and lens 130).

In some embodiments, the device includes one or more input devices configured for receiving a user input requesting an adjustment of a distance between the first eye and a lens of the first set of one or more lenses (e.g., adjusting an eye relief). In some embodiments, eye positioning device 184 is coupled with a mechanical positioning device, such as a linear motor, or a rotary motor coupled with a rail or a rack and pinion, and the device is configured to move eye positioning device 184 in accordance with the user input requesting an adjustment of the eye relief (e.g., a user pressing a button initiate movement of eye positioning device 184). In some embodiments, the one or more input devices comprise a rotating eyecup.

In some embodiments, the device includes a third light source device that is distinct from the first light source device and the second light source device and configured to transmit a seventh light in a seventh direction. The device also includes a fourth light source device that is distinct from the first light source device and the second light source device and configured to transmit an eighth light distinct from the seventh light in an eighth direction. In some embodiments, the eighth direction is distinct from the seventh direction. The device further includes a second set of one or more lenses configured for directing, toward a second eye of a user, the seventh light from the third light source device and the eighth light from the fourth light source device so that the seventh light intersects with the eighth light at a third location that is distinct from the first location and the second location. For example, the first light source device and the second light source device are used for adjusting an eye relief for a left eye, and the third light source device and the fourth light source device are used for adjusting an eye relief for a right eye. The third location corresponds to a design eye relief for the right eye. In some embodiments, the first location and the third location correspond to a same eye relief (e.g., the device is configured for a same eye relief for both left and right eyes).

In some embodiments, the third light source device is configured to transmit a ninth light in a ninth direction that is distinct from at least one of the seventh direction and the eighth direction. The fourth light source device is configured to transmit a tenth light in a tenth direction that is distinct from at least one of the seventh direction and the eighth direction. In some embodiments, the tenth direction is distinct from the ninth direction. The second set of one or more lenses is configured for directing toward the second eye of the user, the ninth light from the third light source device and the tenth light from the fourth light source device so that the ninth light intersects with the tenth light at a fourth location that is distinct from the first location, the second location, and the third location. For example, the fourth location does not correspond to a design eye relief for the right eye.

In some embodiments, a combination of the first light and the second light indicates that the first eye receiving both the first light and the second light is at a predefined eye relief of the device (e.g., FIG. 1M).

In some embodiments, the first light indicates that the first eye receiving the first light is aligned with a center of the first set of one or more lenses in one of a horizontal direction and a vertical direction. For example, in FIG. 1N, light 134 indicates that eye 140 is aligned with lens 130 in a horizontal direction (e.g., a center of lens 130 and a center of eye 140 are horizontally aligned, although they may be offset vertically). The second light indicates that the first eye receiving the second light is aligned with a center of the first set of one or more lenses in the other of a horizontal direction or a vertical direction. For example, in FIG. 1N, light 156 indicates that eye 140 is aligned with lens 130 in a vertical direction (e.g., a center of lens 130 and a center of eye 140 are vertically aligned, although they may be offset horizontally).

In some embodiments, the device includes one or more display screens (e.g., light emission device array 110) configured to project one or more images through the first set of one or more lenses. In some embodiments, the device includes a single display screen for both left and right eyes. In some embodiments, the device includes separate display screens for the left and right eyes (e.g., a first display screen for the left eye and a second display screen that is distinct and separate from the first display screen for the right eye).

In some embodiments, the device is a head-mounted display device (e.g., FIG. 1R).

In some embodiments, the device includes an adjustable mount configured to holding at least one lens of the first set of one or more lenses and move a position of the at least one lens of the first set of one or more lenses. For example, the mount is slidably coupled with one or more rails. This allows adjusting a lateral position of the at least one lens of the first set of one or more lenses (e.g., FIGS. 1C-1E). In some embodiments, the device includes a first adjustable mount configured for holding at least one lens of the first set of one or more lenses and moving a position of the at least one lens of the first set of one or more lenses, and a second adjustable mount configured for holding at least one lens of the second set of one or more lenses and moving a position of the at least one lens of the second set of one or more lenses. In some embodiments, the first adjustable mount is mechanically coupled with the second adjustable mount (e.g., the at least one lens of the first set of one or more lenses and the at least one lens of the second set of one or more lenses move concurrently toward a nasal region or toward respective temporal regions).

In some embodiments, the device includes a light source device configured to transmit, in conjunction with the first light source device transmitting the first light and the second light source device transmitting the second light, a reference light through the first set of one or more lenses (e.g., pixel 124 emits reference light 138).

In accordance with some embodiments, a method includes transmitting, from a first light source device, a first light in a first direction (e.g., light 134 from light source device 122-1 shown in FIG. 1L); transmitting, from a second light source device, a second light that is distinct from the first light in a second direction (e.g., light 154 from light source device 122-2 shown in FIG. 1L). In some embodiments, the second direction is distinct from the first direction. The method also includes transmitting the first light and the second light through a first set of one or more lenses and directing the first light and the second light toward a first eye of a user (e.g., a left eye of the user). In some embodiments, the first light and the second light are transmitted concurrently. However, the first light and the second light need not be transmitted concurrently. For example, the first light and the second light are transmitted sequentially. In another example, the first light and the second light are transmitted alternatingly so that they are not transmitted concurrently.

In accordance with some embodiments, a method includes receiving a portion of a light beam that includes a first light from a first light source device (e.g., light 134 from light source device 122-1 as shown in FIG. 1L) and a second light that is distinct from the first light from a second light source device (e.g., light 154 from light source device 122-2 as shown in FIG. 1L). The first light and the second light have been transmitted through a first set of one or more lenses. After transmitting through the first set of one or more lenses, the first light is configured to intersect with the second light. The method also includes, in accordance with a determination that the received portion of the light beam does not include both the first light and the second light, adjusting a distance between an eye and a lens of the first set of one or more lenses (e.g., adjusting an eye relief). For example, when eye 140 does not receive, through pupil 150, both light 134 and light 154 as shown in FIG. 1L, the user can determine that eye 140 is not located at a position that corresponds to a design eye relief, and initiate adjusting the distance between eye 140 and lens 130 by rotating an eyecup, sliding eye positioning device 184, activating an actuator, such as a motor, etc.

In some embodiments, the method includes, in accordance with a determination that the received portion of the light beam includes both the first light and the second light, ceasing to adjust the distance between the eye and the lens of the first set of one or more lenses (e.g., when eye 140 receives, through pupil 150, both light 134 and light 154 as shown in FIG. 1M, the user can determine that eye 140 is located at a position that corresponds to a design eye relief, and stops adjusting the distance between eye 140 and lens 130).

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings.

For example, in accordance with some embodiments, a device includes a first light source device configured to transmit a first light in a first direction (e.g., and not in a second direction that is distinct from the first direction). In some embodiments, the first light source device includes barrier 146 with an opening (e.g., a pinhole or a slit) and light emitting component 142-2, but not light emitting components 142-1 and 142-3 shown in FIG. 1G. In some embodiments, the first light source device includes lens 144 (e.g., a cylinder lens) and light emitting component 142-2, but not light emitting components 142-1 and 142-3 shown in FIG. 1F. The device also includes a first set of one or more lenses configured for directing the first light toward a first eye of a user. The first light is spatially restricted (e.g., a beam of the first light directed toward the first eye of the user has a width or a diameter less than 5 mm, 4 mm, 3 mm, 2 mm, or 1 mm). The first light provides a cue for adjusting a location of the first set of one or more lenses. In some embodiments, the first light is transmitted through a lateral center of the first set of one or more lenses. Thus, when a user sees the first light with the first eye, this indicates that the first set of one or more lenses is aligned with the first eye.

When the user does not see the first light with the first eye, this indicates that the first set of one or more lenses is not aligned with the first eye.

In accordance with some embodiments, a method includes transmitting a first light in a first direction, and transmitting the first light through a first set of one or more lenses and directing the first light toward a first eye of a user. The first light is spatially restricted. The first light provides a cue for adjusting a location of the first set of one or more lenses.

In accordance with some embodiments, a method includes receiving at least a portion of a bundle of a first light that is spatially restricted. The method also includes, in accordance with a determination that the at least a portion of a bundle of the first light is received, moving the first set of one or more lenses (e.g., based on an intensity of the received portion of the bundle of the first light so that a center of the bundle of the first light is received by a first eye of a user). Alternatively, the method includes, in accordance with a determination that no portion of the bundle of the first light is received, moving the first set of one or more lenses (because the first set of one or more lenses is not aligned with the first eye of the user).

The embodiments described herein were chosen in order to best explain the principles underlying the claims and their practical applications, to thereby enable others skilled in the art to best use the embodiments with various modifications as are suited to the particular uses contemplated.

What we claim is:

1. A device for providing position guidance light toward an eye of a user, comprising:

a first device including:

a first light source for outputting first light;

a second light source for outputting second light; and a first optical element for steering the first light and the second light in distinct directions so that the first light and the second light are spatially separated on a first reference plane; and a second device including:

a third light source for outputting third light;

a fourth light source for outputting fourth light; and a second optical element for steering the third light and the fourth light in distinct directions so that the third light and the fourth light are spatially separated on a second reference plane substantially parallel or perpendicular to the first reference plane for providing a cue for adjusting a distance of the eye from the device, wherein:

the first light and the third light are directed to intersect at a first location corresponding to a predefined eye relief of the device such that a combination of the first light and the third light entering a pupil of the eye indicates that the eye receiving both the first light and the third light is at the predefined eye relief, wherein the predefined eye relief corresponds to a design eye relief position for the device; and the second light and the fourth light are directed to intersect at a second location such that a combination of the second light and the fourth light entering the pupil of the eye indicates that the distance between the eye receiving both the second light and the fourth light is shorter or longer than the predefined eye relief of the device.

2. The device of claim 1, wherein:

the first optical element and the second optical element are selected from a group consisting of: a lens, an optical barrier with an opening, an optical grating, a set of dichroic mirrors, or a light guide with one or more extraction features.

3. The device of claim 1, wherein:

the first light, the second light, the third light, and the fourth light are distinguishable from one another based on at least one of: a color and a time-dependent intensity pattern.

4. The device of claim 1, further including:

an electronic display including an array of light emitting devices for providing image light toward the eye of the user, wherein the first device and the second device are positioned adjacent to the electronic display.

5. The device of claim 1, further including:

an electronic display including an array of light emitting devices for providing image light toward the eye of the user, wherein at least one of the first device or the second device is embedded in the array of light emitting devices.

6. The device of claim 1, further comprising:

an eyecup, a goggle frame, or a cushion coupled with a goggle frame mounted on a rail or a thread for adjusting the distance between the eye and the device.

7. The device of claim 1, wherein the first light intersects with the third light at a first location at a first distance from one or more lenses and the second light intersects with the fourth light at a second location at a second distance, distinct from the first distance, from the one or more lenses.

8. A head-mounted display device, comprising:

the device of claim 1; and an electronic display for providing image light toward the eye of the user.

9. The device of claim 1, wherein upon the second light and fourth intersecting at the second location, the device is configured to adjust the distance between the eye and one or more lenses by rotating an eyecup, sliding an eye positioning device, or activating an actuator.

10. The device of claim 1, further including:

an electronic device including an array of light emitting devices, wherein:

a respective light emitting device of the array of light emitting devices is positioned to output a reference light toward the eye of the user, the reference light having a color and/or a time-dependent intensity pattern corresponding to a color and/or time-dependent intensity pattern of the first light; and a combination of the reference light and the first light indicates whether the first light is received by the eye of the user.

11. The device of claim 10, wherein:

the respective light emitting device is positioned at a center of the array of light emitting devices and the combination of the reference light and the first light indicates whether the eye of the user receiving the reference light and the first light is aligned with the center of the array of light emitting devices.

12. The device of claim 1, wherein:

the first light indicates that the eye receiving the first light is aligned with a center of the of the device in one of a horizontal direction and a vertical direction.

13. The device of claim 12, wherein:

the third light indicates that the eye receiving the third light is aligned with the center of the device in the other of the horizontal direction and the vertical direction.

14. A method for providing position guidance light toward an eye of a user performed at a device including a first device and a second device, the method comprising:

at the first device of a device including a first light source, a second light source, and a first optical element:

outputting first light from the first light source;

outputting second light from the second light source; and steering, with the first optical element, the first light and the second light in distinct directions so that the first light and the second light are spatially separated on a first reference plane; and at the second device including a third light source, a fourth light source, and a second optical element:

outputting third light from the third light source;

outputting fourth light from the fourth light source; and steering, with the second optical element, the third light and the fourth light in distinct directions so that the third light and the fourth light are spatially separated on a second reference plane substantially parallel or perpendicular to the first reference plane for providing a cue for adjusting a distance of the eye from the device, wherein:

the first light and the third light are directed to intersect at a first location corresponding to a predefined eye relief of the device such that a combination of the first light and the third light entering a pupil of the eye indicates that the eye receiving both the first light and the third light is at the predefined eye relief, wherein the predefined eye relief corresponds to a design eye relief position for the device; and the second light and the fourth light are directed to intersect at a second location such that a combination of the second light and the fourth light entering the pupil of the eye indicates that the distance between the eye receiving both the second light and the fourth light shorter or longer than the predefined eye relief of the device.

15. The method of claim 14, wherein:

the first optical element and the second optical element are selected from a group consisting of: a lens, an optical barrier with an opening, an optical grating, a set of dichroic mirrors, or a light guide with one or more extraction features.

16. The method of claim 14, wherein:

the first light, the second light, the third light, and the fourth light are distinguishable from one another based on at least one of: a color and a time-dependent intensity pattern.

17. The method of claim 14, wherein:

the device further includes an electronic display including an array of light emitting devices;

the first device and the second device are positioned adjacent to the electronic display; and the method comprises providing, with the electronic display, image light toward the eye of the user.

18. The method of claim 14, further comprising adjusting the distance between the eye and one or more lenses by rotating an eyecup, sliding an eye positioning device, or activating an actuator upon the second light and fourth light intersecting at the second location.

19. The method of claim 14, wherein:

the device further includes an electronic display including an array of light emitting devices;

the method comprises outputting, with a respective light emitting device of the array of light emitting devices, a reference light toward the eye of the user, the reference light having a color and/or a time-dependent intensity pattern corresponding to a color and/or time-dependent intensity pattern of the first light; and a combination of the reference light and the first light indicates whether the first light is received by the eye of the user.

20. The method of claim 19, wherein:

the respective light emitting device is positioned at a center of the array of light emitting devices and the combination of the reference light and the first light indicates whether the eye of the user receiving the reference light and the first light is aligned with the center of the array of light emitting devices.

* * * * *